(12) United States Patent
Vontz et al.

(10) Patent No.: US 8,365,386 B2
(45) Date of Patent: Feb. 5, 2013

(54) CONNECTION PROCESS AND FRAMING DEVICE

(75) Inventors: Albert Vontz, Untermeitingen (DE); Thomas Dobkowitz, Kissing (DE); Elisabeth Schärtl, Dachau (DE)

(73) Assignee: KUKA Systems GmbH, Augsburg (DE)

( * ) Notice: Subject to any disclaimer, the term of this patent is extended or adjusted under 35 U.S.C. 154(b) by 861 days.

(21) Appl. No.: 12/444,229

(22) PCT Filed: Mar. 13, 2008

(86) PCT No.: PCT/EP2008/002000
§ 371 (c)(1),
(2), (4) Date: Apr. 3, 2009

(87) PCT Pub. No.: WO2008/113508
PCT Pub. Date: Sep. 25, 2008

(65) Prior Publication Data
US 2010/0024190 A1 Feb. 4, 2010

(30) Foreign Application Priority Data
Mar. 16, 2007 (DE) .................... 20 2007 004 183 U

(51) Int. Cl.
*B23Q 3/00* (2006.01)
(52) U.S. Cl. ................ 29/464; 29/468; 29/466; 901/31; 228/49.2; 228/47.1; 228/212
(58) Field of Classification Search ............... 29/464, 29/466, 468; 901/41, 42, 31, 40, 6; 228/47.1, 228/49.1, 49.4, 212, 213, 44.3, 49.2
See application file for complete search history.

(56) References Cited

U.S. PATENT DOCUMENTS

| | | | | | |
|---|---|---|---|---|---|
| 3,913,820 | A | * | 10/1975 | Valentine | 228/25 |
| 4,316,072 | A | * | 2/1982 | Arnoldt | 219/86.24 |
| 4,392,604 | A | * | 7/1983 | Sears | 228/212 |
| 4,639,184 | A | * | 1/1987 | Knasel et al. | 414/730 |
| 4,875,273 | A | * | 10/1989 | Yamamoto | 29/467 |
| 4,894,901 | A | * | 1/1990 | Soderberg | 29/428 |
| 4,909,869 | A | * | 3/1990 | Sakamoto et al. | 156/64 |
| 5,127,139 | A | * | 7/1992 | McCowin et al. | 29/26 A |
| 5,299,894 | A | * | 4/1994 | McCowin | 408/1 R |
| 5,649,888 | A | * | 7/1997 | Micale et al. | 483/11 |
| 5,664,311 | A | * | 9/1997 | Banks et al. | 29/407.04 |
| 5,795,421 | A | | 8/1998 | Takahashi et al. | |
| 6,036,082 | A | * | 3/2000 | Caldarone | 228/212 |
| 6,546,616 | B2 | * | 4/2003 | Radowick | 29/720 |

(Continued)

FOREIGN PATENT DOCUMENTS

| DE | 42 34 674 | | 4/1993 |
|---|---|---|---|
| DE | 43 06 683 | A1 | 9/1994 |

(Continued)

*Primary Examiner* — Essama Omgba
(74) *Attorney, Agent, or Firm* — McGlew and Tuttle, P.C.

(57) ABSTRACT

A framing device (1) and a method are provided for connecting disk-type bodies (6) to a frame (5) by a manipulator (2). A joining device (4) is associated with the manipulator (2), for joining individual frame parts (8, 9, 10, 11) to the disk-type body. The manipulator (2) guides the disk-type body (6) and inserts it into the frame parts (8, 9, 10, 11) provided, the frame parts being pressed against the disk edge (7) at the same time or one after the other.

2 Claims, 21 Drawing Sheets

U.S. PATENT DOCUMENTS

| | | | |
|---|---|---|---|
| 6,851,166 B1* | 2/2005 | Demit et al. | 29/281.5 |
| 7,002,102 B2* | 2/2006 | Munch et al. | 219/124.34 |
| 7,100,271 B2* | 9/2006 | Baulier | 29/711 |
| 7,575,408 B2* | 8/2009 | Tominaga | 414/416.08 |
| 7,755,002 B2* | 7/2010 | Jeong | 219/158 |
| 7,802,364 B2* | 9/2010 | Baulier | 29/897.2 |
| 7,818,863 B2* | 10/2010 | Maekawa et al. | 29/407.01 |
| 7,854,361 B2* | 12/2010 | Gauggel | 228/49.1 |
| 8,185,240 B2* | 5/2012 | Williams et al. | 700/245 |
| 2002/0138962 A1* | 10/2002 | Martin et al. | 29/430 |
| 2002/0152598 A1* | 10/2002 | Sarh | 29/418 |
| 2002/0157234 A1* | 10/2002 | Sawada et al. | 29/464 |
| 2004/0205953 A1* | 10/2004 | Marume et al. | 29/464 |
| 2004/0261242 A1* | 12/2004 | Kilibarda et al. | 29/430 |
| 2005/0144770 A1* | 7/2005 | Sawada et al. | 29/464 |
| 2006/0137164 A1* | 6/2006 | Kraus | 29/407.1 |
| 2006/0245901 A1* | 11/2006 | Yamaoka et al. | 414/692 |
| 2007/0039152 A1* | 2/2007 | Maekawa et al. | 29/407.1 |
| 2008/0092391 A1* | 4/2008 | Jin | 29/897.2 |
| 2008/0163403 A1* | 7/2008 | Tominaga | 901/2 |
| 2011/0162191 A1* | 7/2011 | Kilibarda | 29/466 |

FOREIGN PATENT DOCUMENTS

| | | |
|---|---|---|
| DE | 100 31 076 A1 | 1/2002 |
| EP | 0 282 468 A1 | 9/1988 |
| EP | 1 733 909 A2 | 12/2006 |
| JP | 60113782 A * | 6/1985 |
| JP | 2000005934 | 1/2000 |
| JP | 2005111619 | 4/2005 |
| WO | WO 2005/028167 | 3/2005 |

* cited by examiner

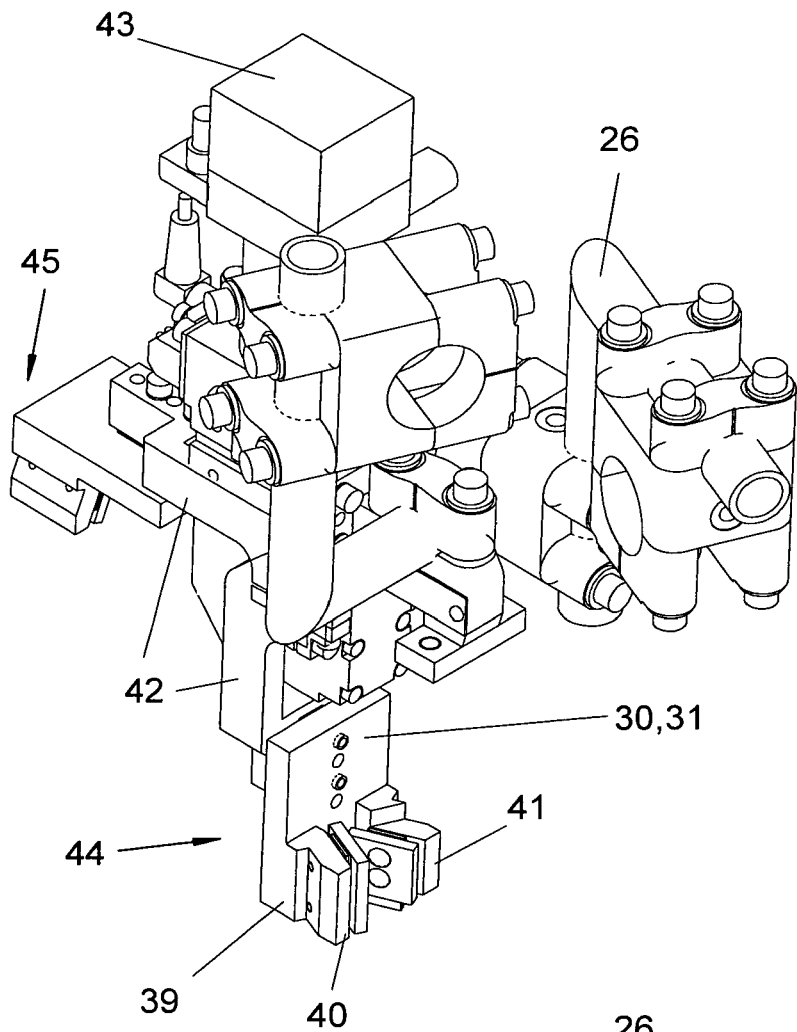
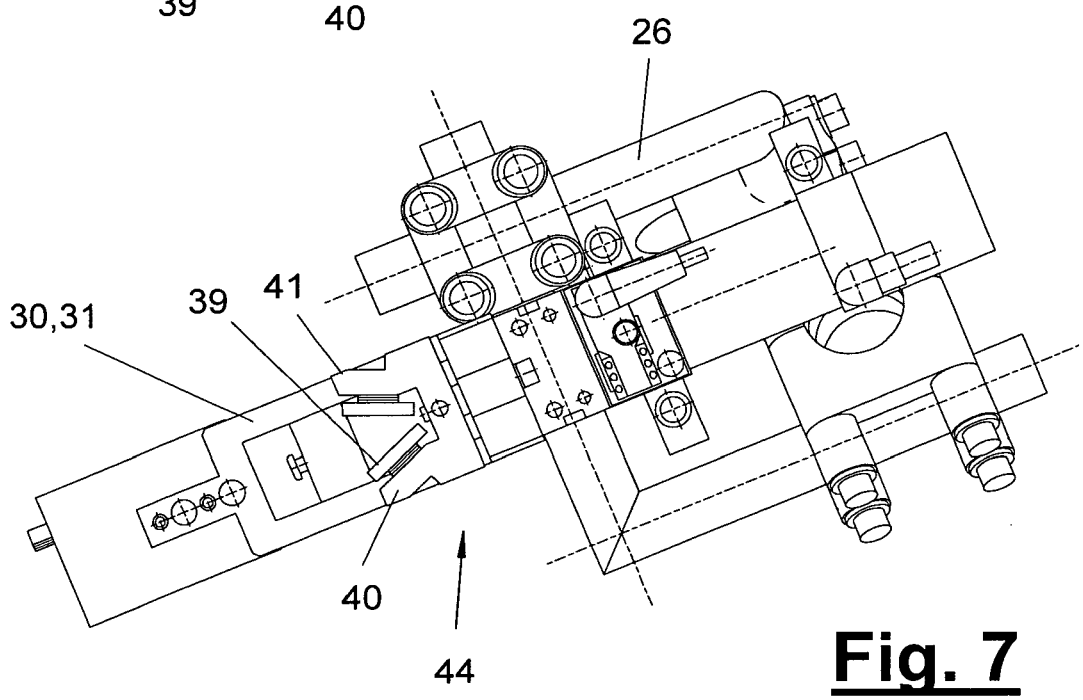
Fig. 6
Fig. 7

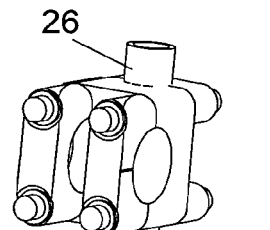
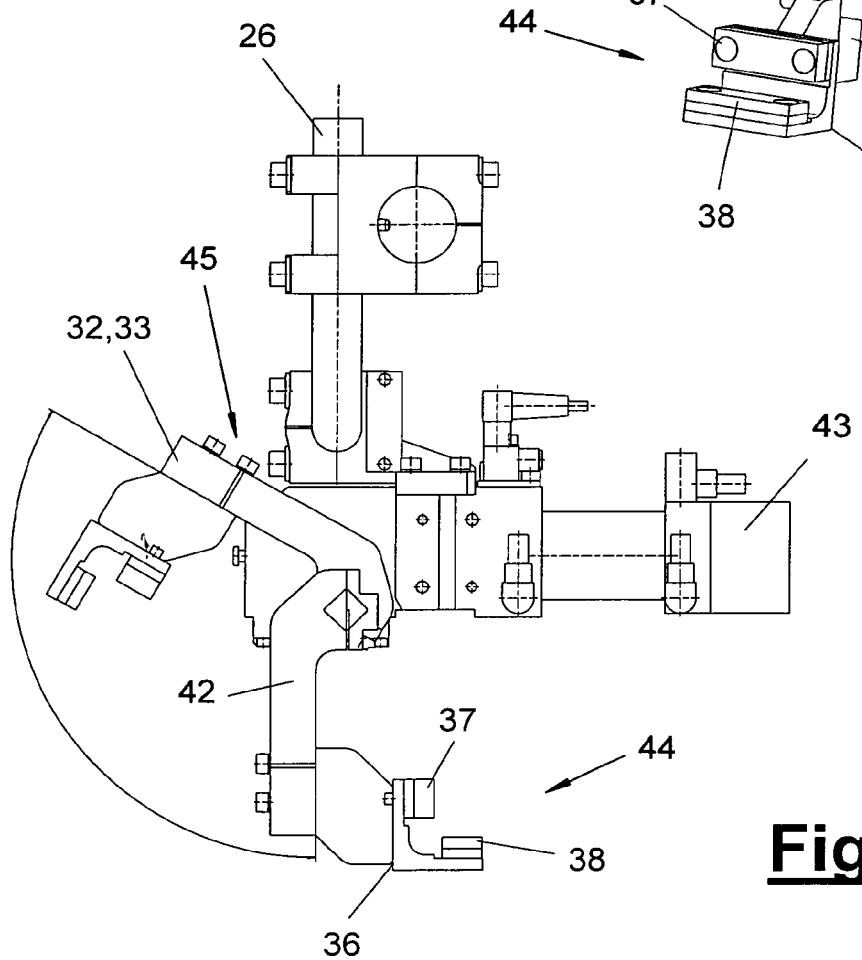
Fig. 10
Fig. 11

CONNECTION PROCESS AND FRAMING DEVICE

CROSS REFERENCE TO RELATED APPLICATIONS

This application is a United States National Phase application of International Application PCT/EP2008/002000 and claims the benefit of priority under 35 U.S.C. §119 of German Patent Application DE 20 2007 004 183.7 filed Mar. 16, 2007, the entire contents of which are incorporated herein by reference.

FIELD OF THE INVENTION

The present invention pertains to a connection process connecting pane-like bodies to a frame by means of a manipulator and to a framing device for connecting pane-like bodies to a frame wherein the framing device has at least one manipulator.

BACKGROUND OF THE INVENTION

It is known in the manufacture of sunroofs from EP 1 733 909 A2 that a glass pane is inserted into a prepared sunroof frame by means of a robot. The sunroof frame is prepared and manufactured externally and is available as a finished component at the robot station for insertion of the pane. The sunroof frame is open on one side for insertion of the pane. Only a bonded connection is provided for fastening the pane. The use of the robot is limited to the handling of the pane. The overall effort is relatively great due to the external manufacture of the frame.

SUMMARY OF THE INVENTION

The object of the present invention is to show an improved framing device.

According to the invention, a process is provided for connecting pane-like bodies to a frame by means of a manipulator. A plurality of individual frame parts are picked up with the manipulator and joined at the pane edge while forming the frame.

According to another aspect of the invention, a framing device is provided for connecting pane-like bodies to a frame. The framing device has at least one manipulator. A joining means for joining individual frame parts at the pane-like body is associated with the manipulator.

The connection and framing technique being claimed has the advantage that the robot can perform a plurality of functions and is used not only to handle the pane, but also to pick up and join the frame and the frame parts thereof. The frame may have an essentially U-shaped profile shape and extend around the edge of the frame in a positive-locking manner. Due to the joining means being carried along by the manipulator at least in parts, the frame can be built up of a plurality of frame parts at the pane-like body. This simplifies and expedites the framing process. The costs and design effort are low. On the other hand, the economy and flexibility of the framing device are very high. In addition, the rapidity of the joining process and the possibility of full automation are favorable.

The framing device may be used for any desired type of pane-like bodies. Likewise, the type and size of the frames and frame parts thereof can be varied as desired. The number of frame parts may also be as high as desired thanks to the kinematics of the robot. The frame may be closed all around or open or interrupted in some areas.

A positive-locking connection, which ensures secure holding of the pane-like body in the frame on a plurality of sides, can be established between the frame parts and the pane-like body during the framing process. On the other hand, the connection of the frame parts can be secured in a suitable manner, e.g., by corner connectors or the like. The overall strength of the frame and pane construction is very high, and high precision of manufacture is also offered.

Various types of joining processes can be carried out with the connection technique and the framing device being claimed; for example, the prejoining and picking up of the frame parts as well as the final joining and pressing on of the frame parts can be carried out in one operation or separately one after another in different steps. The manipulator, which is preferably designed as a multiaxial articulated arm robot, can carry out for this the feeding and pressing-on motions for the one-part or multipart joining process. As an alternative, the joining means may have active clamping and pressing tools, which independently ensure the pressing of the frame parts onto the pane-like body.

In particular, tools for directing and guiding as well as for pressing on, which support the joining process, may be arranged at a joining holder or joining bench.

The framing device being claimed does, moreover, offer the advantage that possible warping in the pane-like bodies can be equalized during the process with a leveling means. Permanent compensation of warping can be achieved by the frame attached subsequently.

The joining means makes it possible to combine the manufacture of the frame and the insertion of the pane with one another and to optimally adapt the components frame and pane to one another in the process. Possible tolerances can also be compensated. The end product of the framed pane has maximum quality. In addition, the handling and framing process can take place in such a way that the pane-like bodies are maximally spared. Even highly sensitive pane-like bodies, e.g., solar cell elements for photovoltaics, can also be processed mechanically as a result.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is one of various views of different types of clamping devices;

FIG. 7 is another of various views of different types of clamping devices;

FIG. 10 is another of various views of different types of clamping devices;

FIG. 11 is another of various views of different types of clamping devices;

DESCRIPTION OF THE PREFERRED EMBODIMENTS

Figure 1:
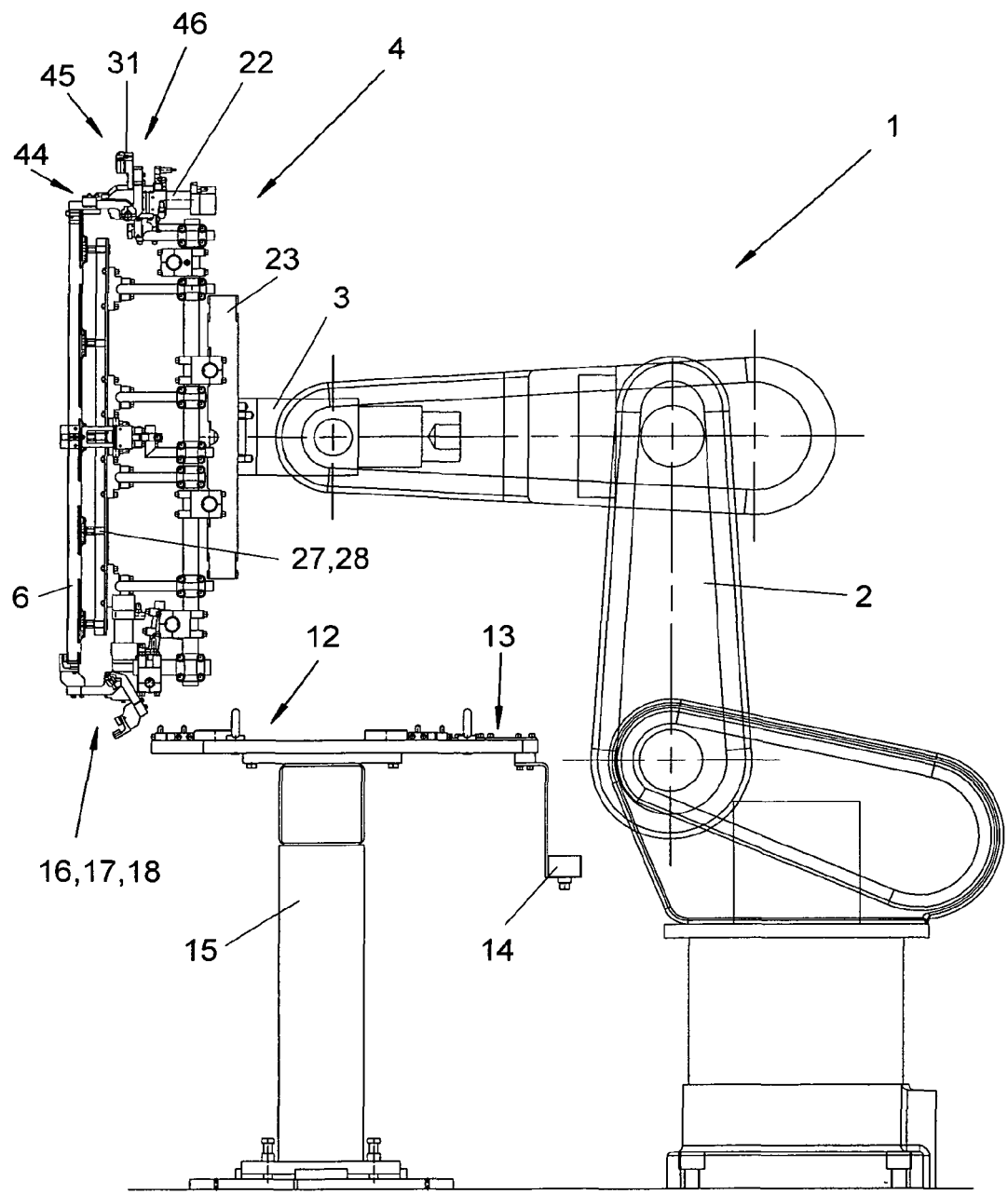
FIG. 1 is a side view of a framing device with robot and joining means.
Figure 2:
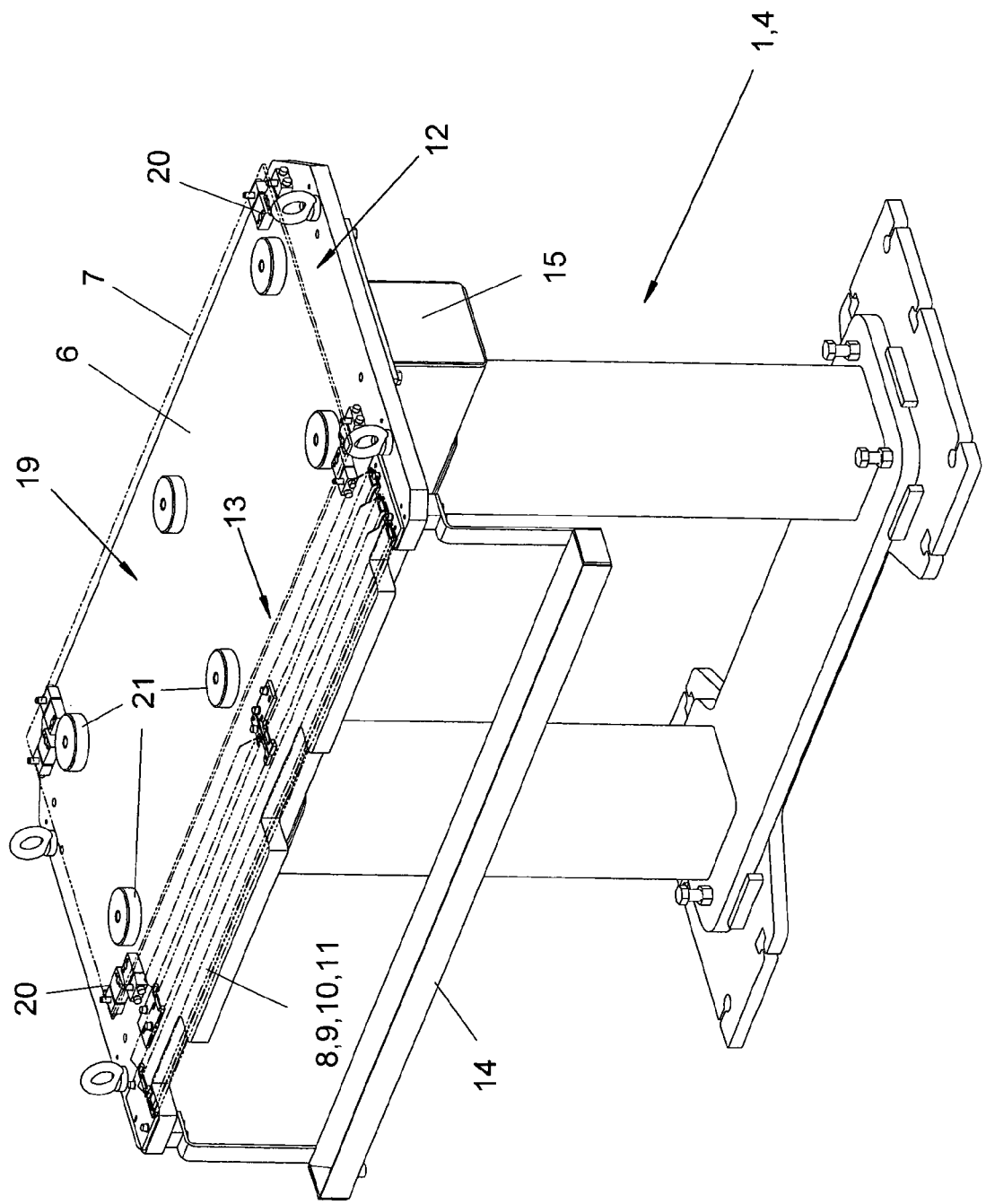
FIG. 2 is a perspective view of a joining bench.

Referring to the drawings in particular, the present invention pertains to a framing device (1) and to a process for connecting at least one pane-like body (6) to a frame (5). It is possible to assemble the frame (5) from a plurality of individual frame parts (8, 9, 10, 11) during joining together with the pane-like body (6). In particular, the pane-like body (6) and the frame (5) can be connected to one another during joining in a positive-locking manner such that separation is only possible by opening the frame (5).

The pane-like body (6) may be of any desired design. It is a plate-shaped part with a rectangular cross section in the exemplary embodiment being shown. The cross-sectional shape may differ as desired, e.g., it may be selected to be pentagonal or polygonal, round or oval or the like. The pane-like body (6) may be present as one pane-like body or as a plurality of pane-like bodies and joined to a frame (5). Besides the plate shape being shown, the pane-like body (6) may also have another shape, in which case the pane or plate shape is present in some areas only, e.g., at the outside and optionally circumferential edges (7). One pane (6) is referred to in the exemplary embodiment explained below. This includes all other types of pane-like bodies.

The pane (6) may serve any desired purpose and have any desired design. For example, it is a plate-shaped solar cell element, which may comprise one or more glass plates, one or more photoelements and one or more additional cover layers as well as a line arrangement and switching arrangement. As an alternative, the pane (6) may be a composite glass pane, an insulating glass pane or another plate-shaped element.

The framing device (1) schematically shown in FIG. 1 has at least one manipulator (2) and a joining means (4) associated therewith for joining the individual frame parts (8, 9, 10, 11) to the pane-like body (6). The joining means (4) may be held and guided entirely or partly by the manipulator (2).

The joining means (4) may have a prejoining means (16) and/or a pressing means (17) for connecting and pressing the frame parts (8, 9, 10, 11) to the pane-like body (6). There are various variants for this, which will be explained below. Furthermore, the joining means (4) may have a leveling means (18) for eliminating warping in the pane-like body (6). In addition, a means (14) for preparing the panes (6) for the process may belong to the joining means (4).

In the exemplary embodiment being shown, the joining means (4) has a joining tool (22), which can be connected to the manipulator (2), and a joining holder (15), which may be designed, e.g., as a stationary joining bench. Two variants of a bench-like joining holder (15) are shown in FIGS. 1 through 22 and FIGS. 23 through 26. In addition, parts of the joining tool (22) are arranged at the joining holder (15) in the embodiment according to FIGS. 23 through 26.

Manipulator (2) may be of any desired and suitable design and have as many axes as desired in any desired design. An articulated arm robot, which has at least six rotatory axes and has a robot hand (3) with a plurality of axes, e.g., two or three axes of rotation, at the front end of the arm, is used in the exemplary embodiment being shown. Robot (2) may have one or more additional axes, e.g., linear or rotatory axes. Furthermore, manipulator (2) may have linear axes and even a combination of translatory and rotatory axes in other exemplary embodiments.

The process for connecting the pane (6) to the frame (5) provides for a plurality of individual frame parts (8, 9, 10, 11) being picked up with the manipulator (2) and joined at the edge (7) of the pane while the frame (5) is formed. In the preferred kinematic variant, manipulator (2) guides the pane (6) and inserts same into frame parts (8, 9, 10, 11) made ready, which are pressed onto the edge of the pane (7) at the same time or later. The frame parts (8, 9, 10, 11) can be pressed on by a clamping means (46) located at the manipulator (2) and/or at least one joining holder (15).

The framing device (1) has a ready position (12) for one or more panes (6). This may be, e.g., the place of deposit (19) for panes shown in FIG. 2 on the essentially horizontal plate of the joining bench (15). One or more panes (6) are made available at the ready position (12) in a preset position, which is known to the manipulator (2) and to the control thereof. A positioning means (20) may be present for this at the place of deposit (19) for the panes, which comprises, for example, a plurality of corner stops and is used for accurately positioning one or more panes (6). The panes (6) may lie flat on the preferably flat bench plate. In the embodiment being shown, they are spaced from the bench plate by a plurality of uniformly distributed support elements (21), which makes it possible to grip under the pane (6) at its edges (7).

The framing device (1) may have, furthermore, a ready position (13) for one or more frame parts (8, 9, 10, 11). A positioning means (20) for the frame parts (8, 9, 10, 11) may be present here as well in order to hold these in a preset position known to the manipulator (2) and to the control thereof. The feeding of the panes (6) and of the frame parts (8, 9, 10, 11) may take place in any desired and suitable manner, i.e., manually or by another handling robot or another feeding means. The frame parts (8, 9, 10, 11) may be delivered, for example, from a component feed with a chute or the like. The joining holder (15) may be arranged in such a variant at the end of the chute. When a plurality of chutes are used, a plurality of joining holders (15) may be provided, which are reached by the manipulator (2) one after another. The ready positions (12, 13) are arranged together at one joining bench (15) for all components (6, 8, 9, 10, 11) necessary for the joining. In a variant of the embodiment shown, the joining holder (15) may be generally a multipart joining holder and arranged distributed at different sites.

In another embodiment, not shown, the ready position (12) may be arranged separately from the joining holder or joining bench (15) and have a different design. The ready position may be, e.g., a conveyor, which feeds the panes (6) and makes them ready in a known position. In another variant, the panes (6) may be fed in a magazine-stored form with a frame or rack and made ready. Besides, any other desired embodiments of a ready position (12) are possible. Variants are also possible for the ready position (13) of the frame parts (8, 9, 10, 11). The ready position (13) may be arranged separately from the joining holder (15) and likewise comprise a conveyor, a frame part magazine or the like.

Frame (5) is joined in the exemplary embodiment being shown to the circumferential outer edge (7) of pane (6) and has a shape corresponding to the contour of the pane. The shape of the frame may vary with the shape of the pane. It may be closed circumferentially at the edge (7) of the pane or open or interrupted in some areas. In the exemplary embodiment being shown, the closed frame (5) comprises two longer straight frame parts (8, 9) and two shorter and straight frame parts (10, 11). The frame parts are connected to one another at the corners and may have a miter cut here.

Frame parts (8, 9, 10, 11) may have any desired cross-sectional shape, which is, e.g., U-shaped essentially or at least in some areas. They comprise, for example, a hollow section, in which an angular corner connector (not shown) can be inserted. Furthermore, at least one mounting groove for the pane (6) may be present. Frame (5) can enclose the pane (6) via the mounting groove on three sides and optionally enclose it circumferentially.

For joining, the frame parts (8, 9, 10, 11) are mounted, for example, with this mounting groove onto the pane edges (7) and optionally pressed on. The pane edges may be provided with a sealing layer and/or an adhesive layer, which is activated prior to joining. The joining and pressing on may take place in one step, the frame parts (8, 9, 10, 11) being mounted onto the pane edges (7) and pressed on at the same time. As an alternative, the joining and pressing on may take place in separate and consecutive steps, mounting first the frame parts (8, 9, 10, 11) onto the pane edges (7) with a clearance and subsequently pressing them onto the pane edges (7) while closing the miter connection in the corners and pressing in the corner angles located there.

A means (14), for example, one connected to the joining bench (15), may be present for preparation for the process for the above-mentioned preparation of the pane. This means may be, for example, a moistening means for the pane edges and the sealing or adhesive coating present there. The moistening means (14) comprises, for example, a tray, which is arranged vertically offset downwardly at the edge of the bench for a moistening liquid and is located essentially below a long edge of the bench and in parallel to same. The moistening means (14) may be equipped with a feeding means for refilling and for checking the filling level.

The joining tool (22) mentioned in the introduction is connected to the manipulator (2) and to the manipulator or robot hand (3) thereof, for example, detachably via a change coupling or the like. The forces and motions for joining and pressing on can be applied by the manipulator (2). The joining holder (15) or joining bench can be used as an outer support or pressure pad for this. As an alternative, the pressing forces may be applied in another manner, e.g., by a clamping means (46) arranged at the joining tool (22) or at another location, e.g., at the joining holder (15).

Figure 3:
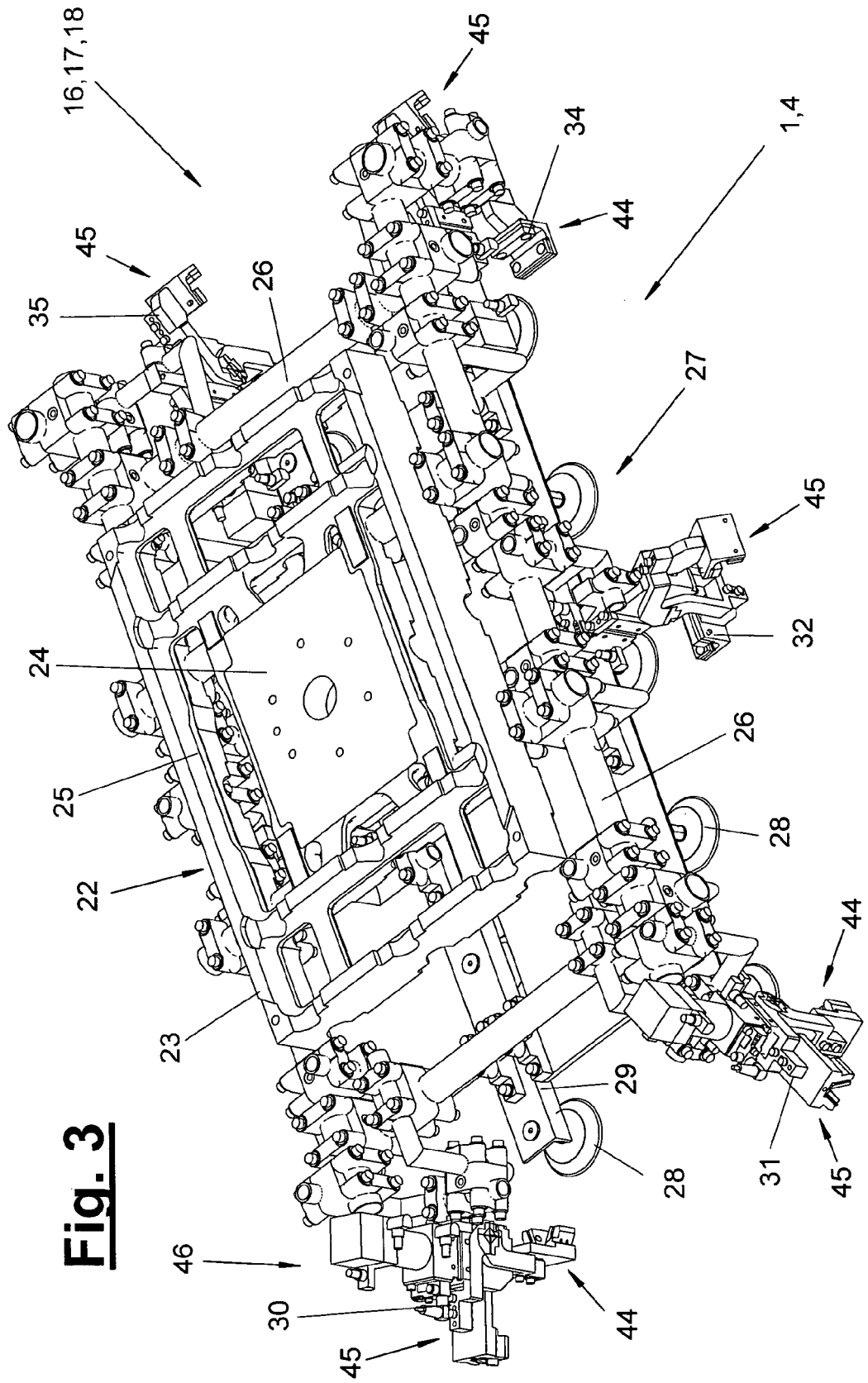
FIG. 3 is a perspective view of a joining tool according to the invention.
Figure 4:
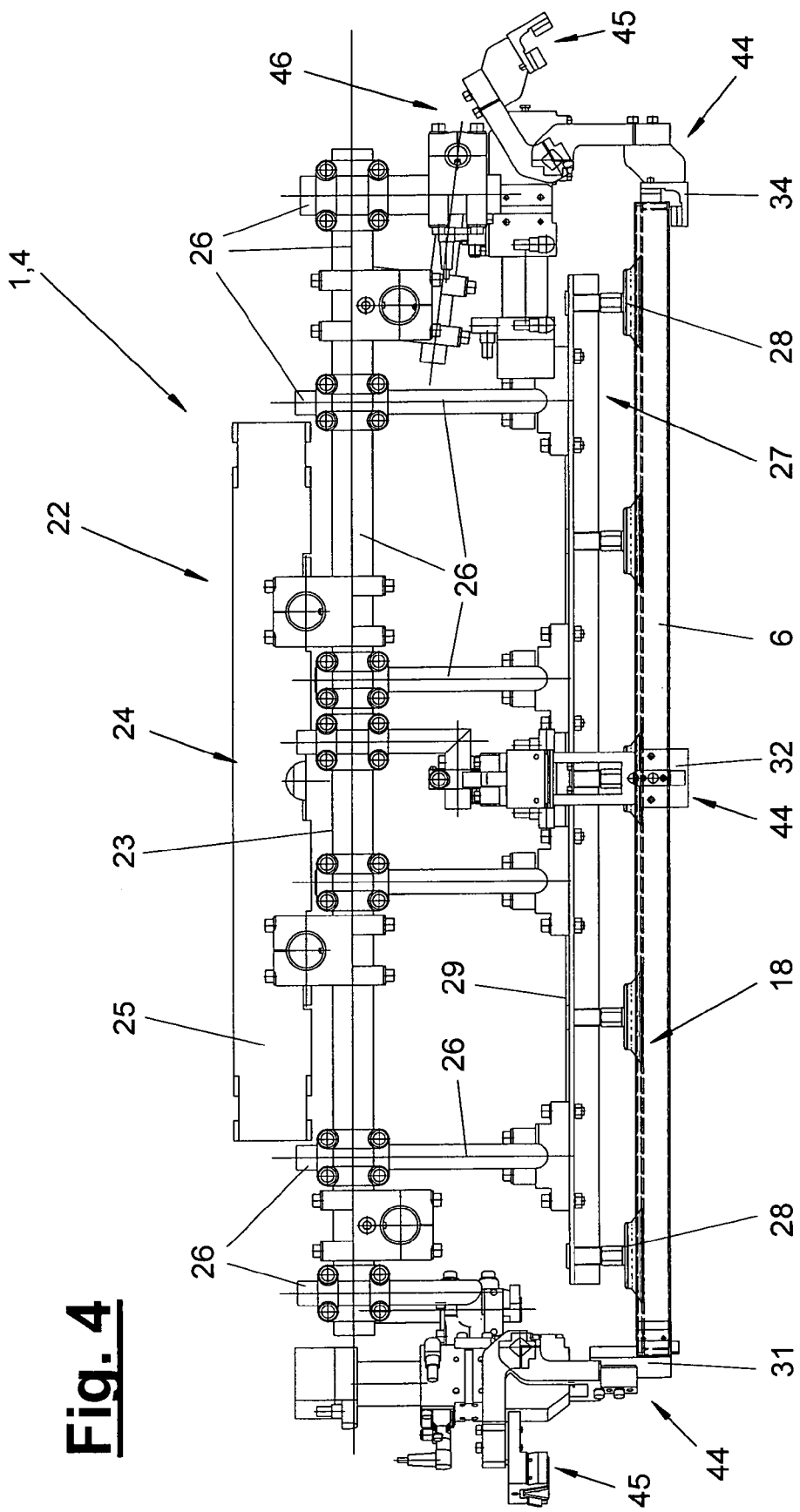
FIG. 4 is a side view of the joining tool.
Figure 5:
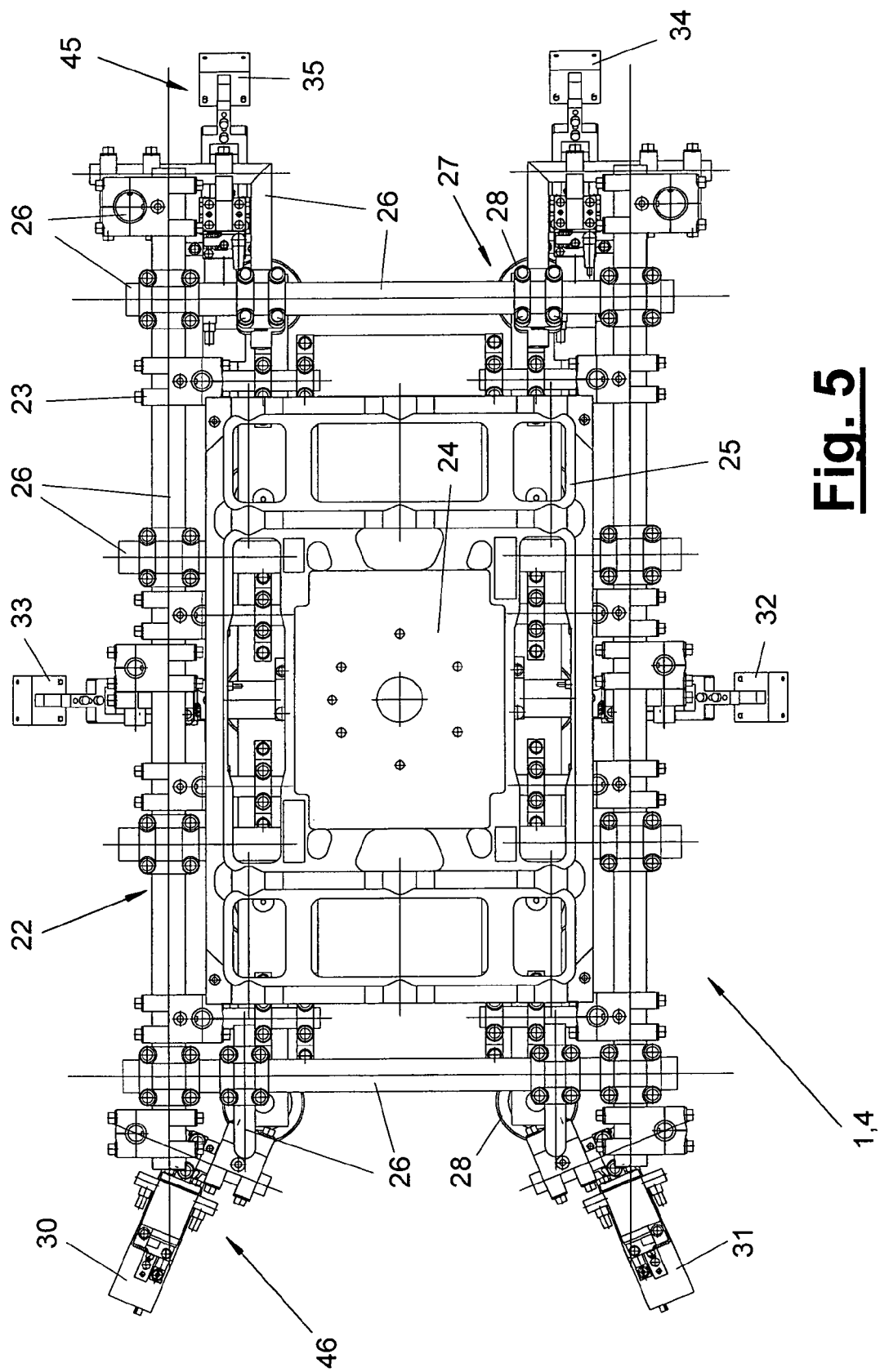
FIG. 5 is a top view of the joining tool.

The joining tool (22) shown in FIGS. 3 through 5 has a mount (23) with a connection (24) for detachable connection to the robot hand (3). Mount (23) may be of any desired and suitable design. In the exemplary embodiment being shown, it is a combined frame mount and rod mount, which may be designed corresponding to WO 2005/028167 A1. It comprises a mounting frame (25) with the connection (24) located on the inside and edge webs with mounting openings for tubular mount arms (26) of, e.g., a cylindrical shape. The mount arms (26) may be connected to one another by crown knots with clamping means or the like. The mount arms (26) may extend in different directions along and at right angles or obliquely to the principal plane of the pane. Frame (23) may be designed, as an alternative, as a welded construction or as a casting.

The joining tool (22) may have a controllable gripping means (27) for holding the one or more pane(s) (6). The gripping means (27) is shown in FIGS. 3 through 5 and 12. It has a plurality of vacuum units (e.g., vacuum/suction grippers) (28), which are arranged at the mount (23) and are connected to a suitable vacuum source (not shown). The vacuum grippers (28) are arranged distributed uniformly over the surface of the pane and are located at one or more carrying means (29), which are in turn connected to frame (23). The connection may be permanent or detachable. For adaptation to panes of different types, sizes and shapes, gripping means (27) may be adjustable and have, for example, manually or motor-driven adjusting means for the vacuum grippers (28).

The vacuum grippers (28) are preferably located all in a common plane of action. They may have flexible suction cups and inner fixed stops (not shown). As a result, they may be part of the leveling means (18) mentioned in the introduction. If a pane (6) is warped and has, e.g., an arch deviating from the desired shape, it can again be aligned flat with the leveling means (18). The joining tool (22) with the suction grippers (28) and the stops thereof is pressed for this against the pane (6) lying on the support elements (21). The support elements (21) and the suction grippers (28) are in a position corresponding to the desired position of the pane (6) and push in cooperation the pane (6) into its desired shape during the feed of the joining tool. The suction grippers (28) are activated in this position and they fix the pane (6) in the desired shape. Due to the elimination of warping, the pane edges (7) also have their desired position for the joining operation described below. If the pane (6) has a shape deviating from the shape of a plate, the support elements (21) and the suction grippers (28) are correspondingly adapted to this shape and to the desired position preset hereby and are arranged accordingly.

In one of the embodiments shown in FIGS. 1 through 22, the joining tool (22) has a controllable clamping means (46), which can be used, on the one hand, to support and guide the pane (6) during joining. The clamping means (46) is used now as a pressure pad for supporting the pane (6) against the joining and pressing-on motion corresponding to the exemplary embodiment explained below. The clamping means (46) is a part of the prejoining means (16) here.

The clamping means (46) may be used alternatively or additionally to apply the pressing forces when, e.g., the frame parts (8, 9, 10, 11) had been joined before to the pane edges (7) loosely or with a clearance and with a relatively weak mounting force. They are a part of the pressing means (17) here.

In the exemplary embodiment shown in FIGS. 1 through 22, the clamping means (46) has a plurality of controllable clamping devices (30, 31, 32, 33, 34, 35), which can be fed, for the pane (6) and/or the frame parts (8, 9, 10, 11), which are arranged, e.g., in three groups and are designed in three variants. FIGS. 6 through 11 specifically show these embodiments. The clamping arrangement at the mount (23) is shown in FIGS. 3 through 5. The clamping devices (30, 31, 32, 33, 34, 35) are arranged rigidly or adjustably at the mount (23). They can be adjusted manually or mechanically, especially when needed and in adaptation to different panes and frame shapes. The adjustment may take place fully automatically if corresponding adjusting drives are provided. The clamping devices (30, 31, 32, 33, 34, 35) are connected to the mount arms (26), for example, via cross clamps and clamping means.

The clamping means (46) has, for example, two or more corner clamping devices (30, 31) at adjacent corner areas of the pane (6). These are arranged at one of the narrow sides of the frame or pane and have stops (39), which are adapted to the free ends of the long frame parts (8, 9). FIGS. 6 and 7 show this arrangement in a perspective view and in a top view. The stops (39) are designed as angle stops and have two stop elements (40, 41), which form, for example, an angle of 45° with one another and are adapted to the miter cut at the end of the frame part. Frame part (8, 9) is in contact with a long side and an oblique miter side with the stop elements (40, 41) in a positive-locking manner, which are aligned and positioned corresponding to the section dimensions by means of shims or the like. These angle stops (39) can absorb the forces acting axially on the long frame parts (8, 9).

Figure 8:
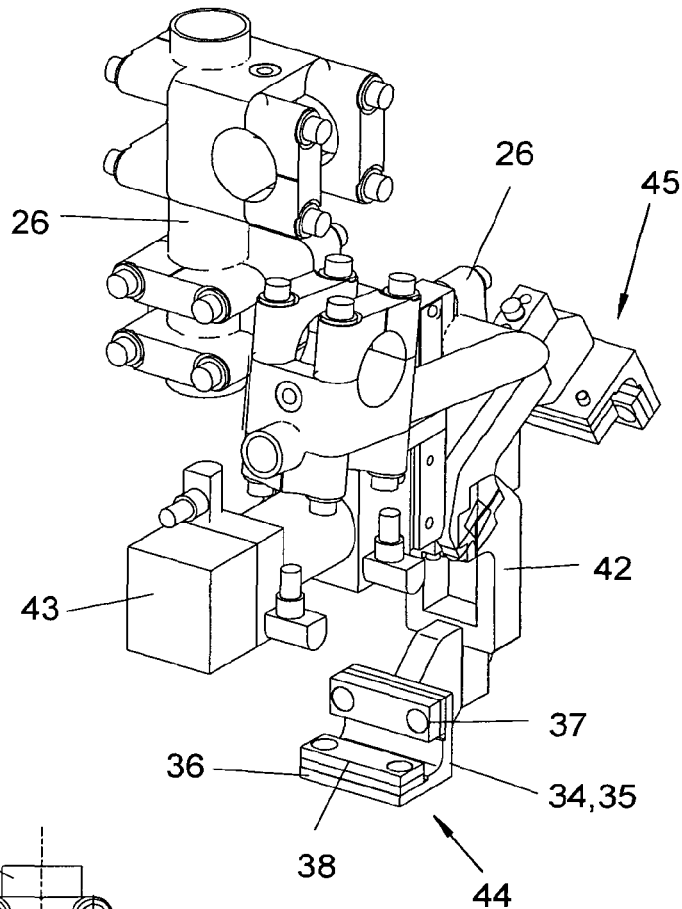
FIG. 8 is another of various views of different types of clamping devices.
Figure 9:
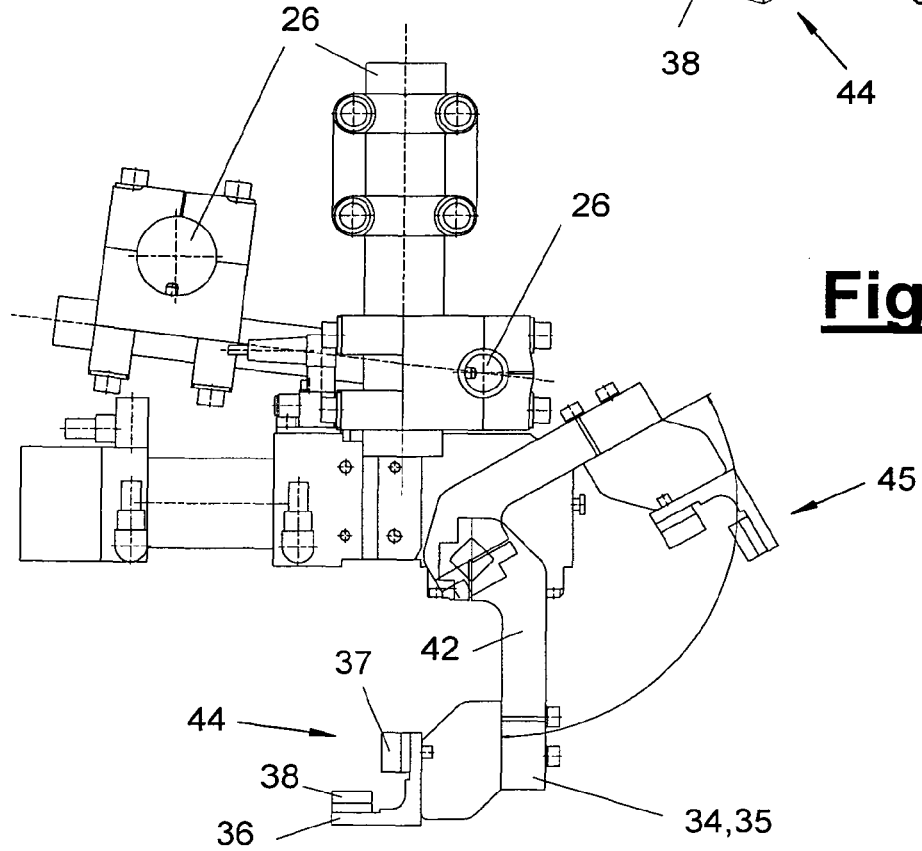
FIG. 9 is another of various views of different types of clamping devices.
Figure 12:
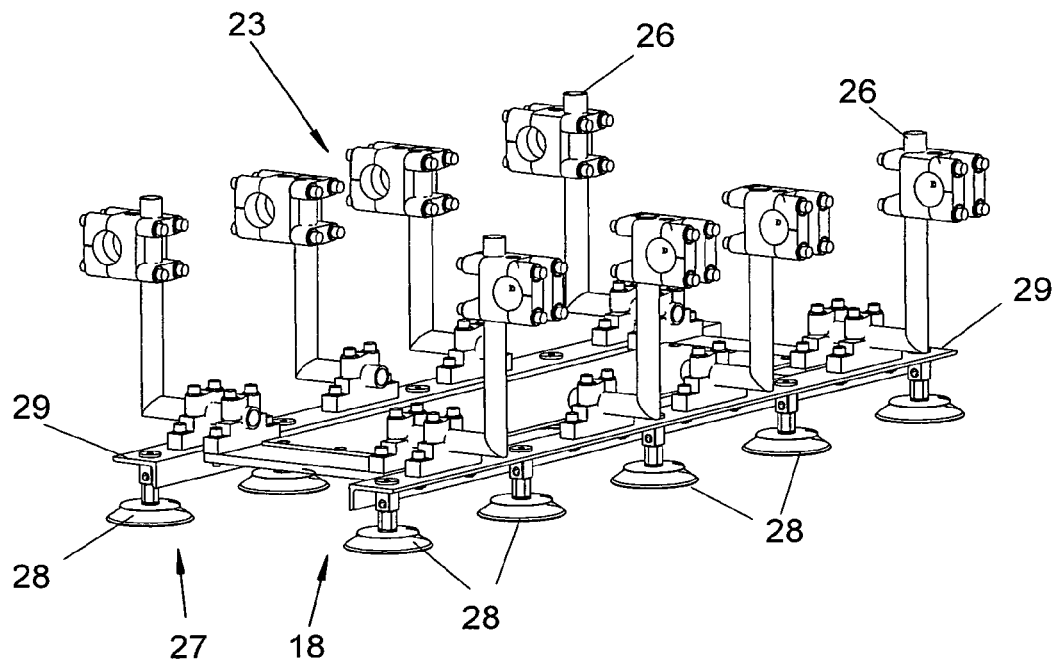
FIG. 12 is a perspective view of a gripping means of the joining tool.
Figure 13:
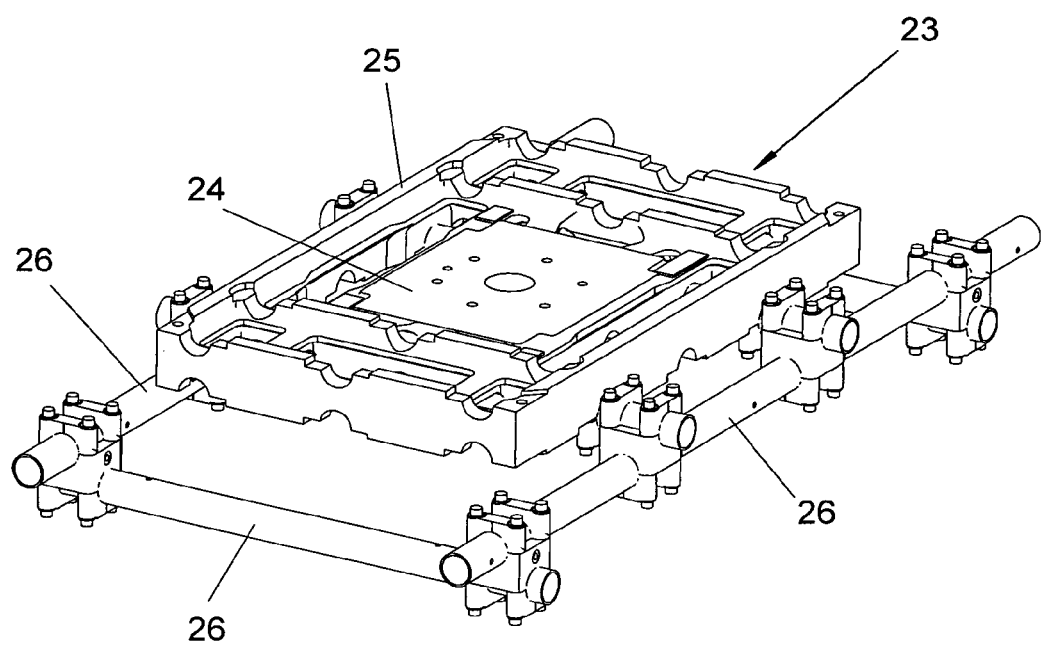
FIG. 13 is a perspective view of a frame of the joining tool.

FIGS. 8 and 9 illustrate other clamping devices, which are designed as end clamping devices (34, 35) and are arranged at the opposite narrow side of the frame (5). They act on the short frame part (10) located there and are adapted to the outer contour thereof. The end clamping devices (34, 35) have stops (36), which extend around the frame part (10) with lateral and lower stop elements (37, 38) laterally and at the bottom in a positive-locking manner and support same. Adaptation of the stop elements (37, 38) in shape and positioning by means of shims or the like in this case is present here as well.

FIGS. 10 and 11 show the third variant of the side clamping devices (32, 33), which are arranged on the long sides of the pane (6) and of the frame (5) and which have a design similar to that of the end clamping devices (34, 35). They extend around the longer frame parts (8, 9) laterally and at the bottom with their stops (36) in a positive-locking manner. The side clamping devices (32, 33) can prevent a lateral bending of the slender frame parts (8, 9) under the action of axial forces.

The clamping devices (30, 31, 32, 33, 34, 35) have a mobile clamping device arm (42) each in the different variants, which can be moved to and fro, for example, pivotably between a clamped position (44) at the frame (5) and a retracted inoperative position (45) by means of a controllable drive (43). The stops (36) and the stop elements (38) are gripped under on the side of the pane located opposite the gripping means (27). Pane (6) is surrounded on all sides and guided in a positive-locking manner as a result.

FIGS. 14 through 22 illustrate an example of a multistep process during the joining of the frame parts (8, 9, 10, 11) at a pane (6). The manipulator (2) is not shown in the drawings for clarity's sake.

Figure 14:
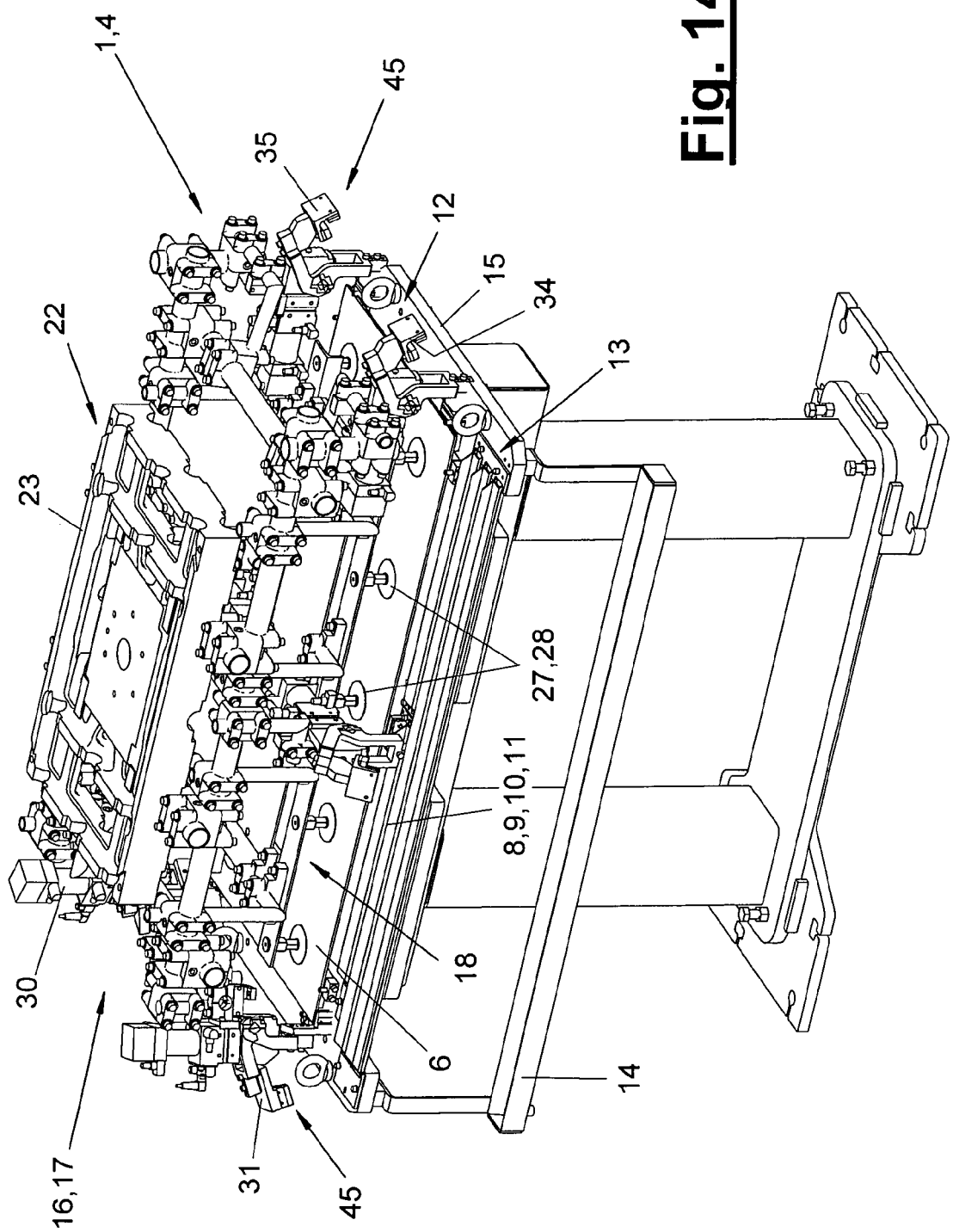
FIG. 14 is a view showing the framing device in one of different functional steps.
Figure 15:
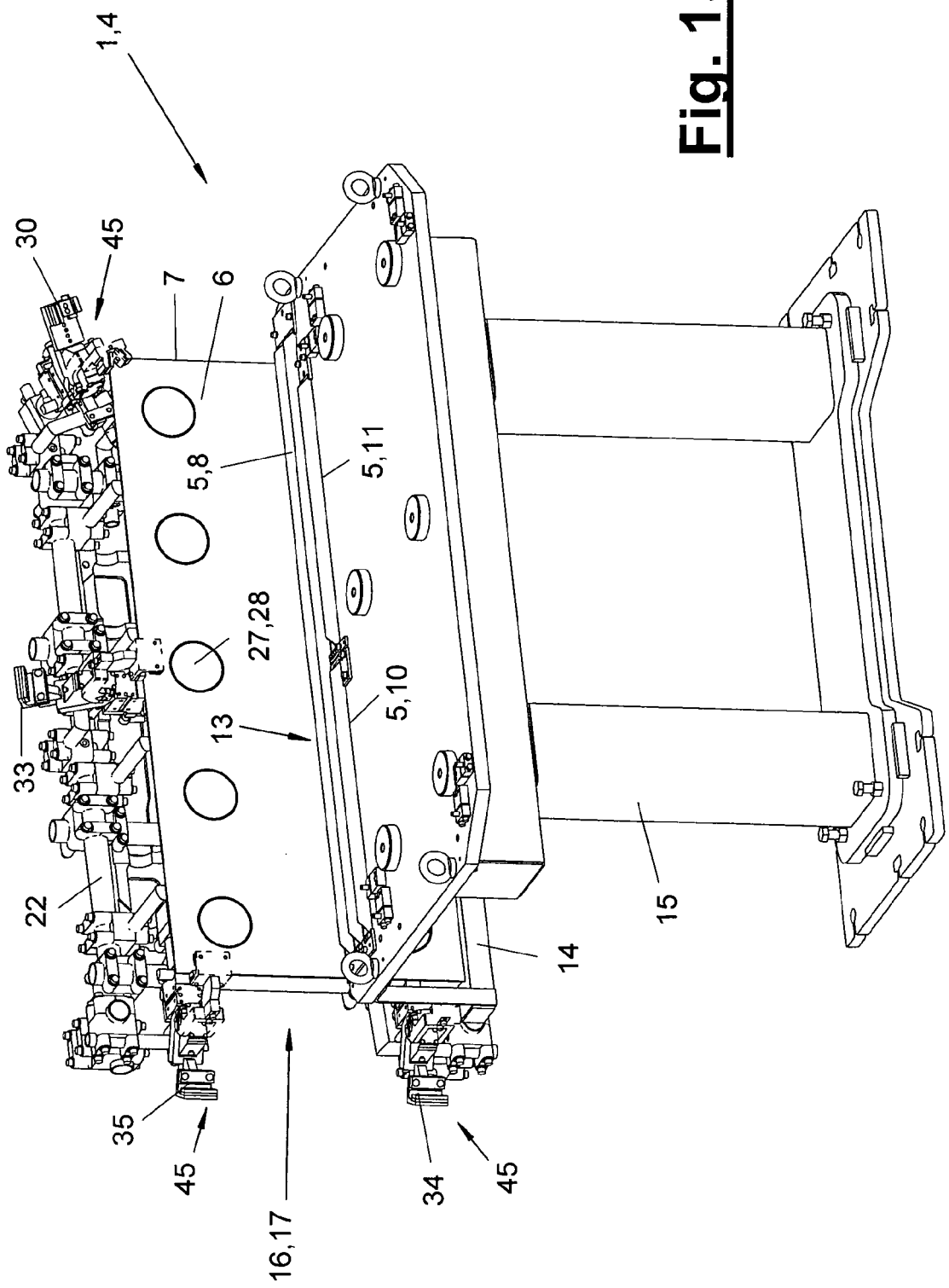
FIG. 15 is a view showing the framing device in another of different functional steps.
Figure 16:
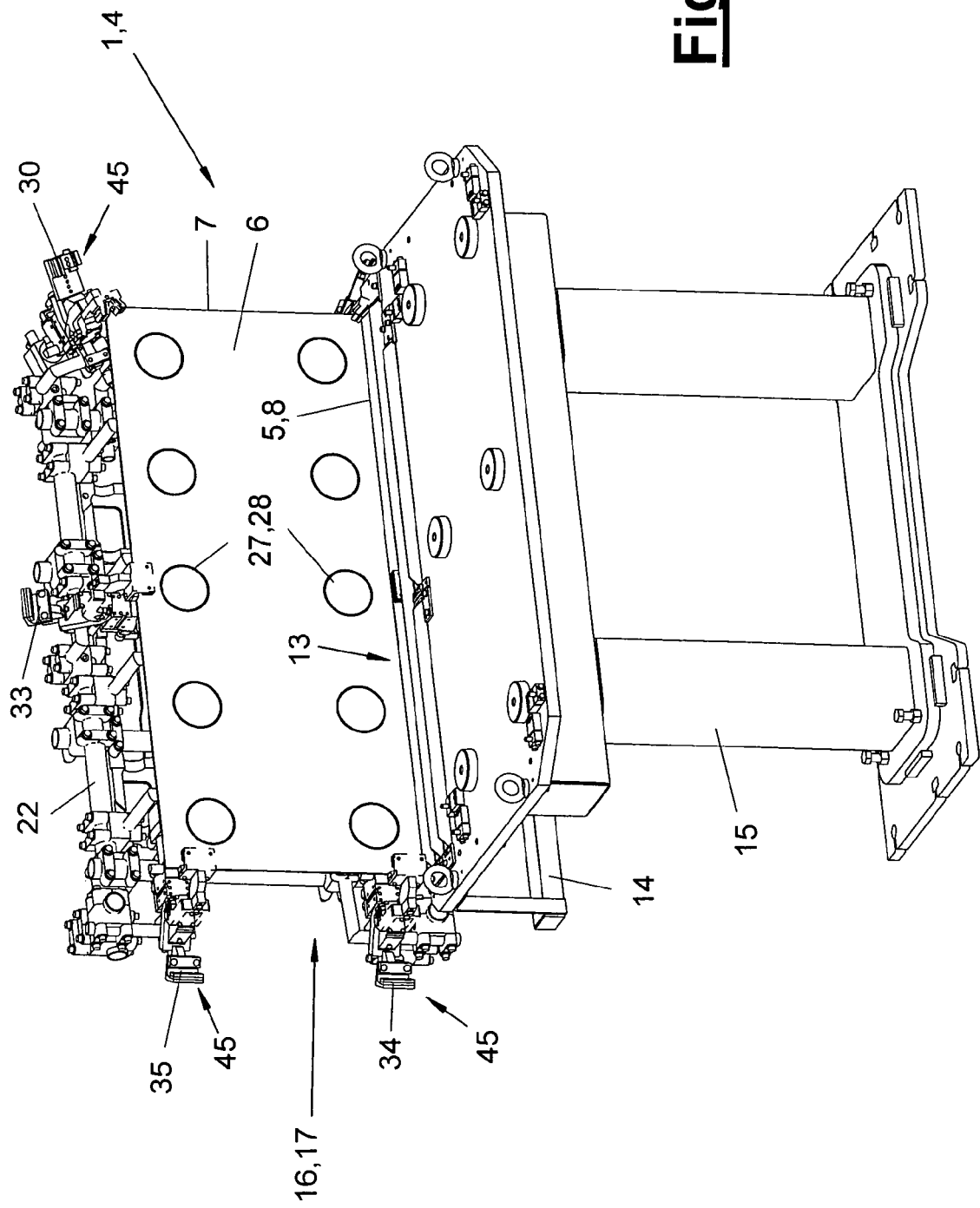
FIG. 16 is a view showing the framing device in another of different functional steps.

In the starting position according to FIG. 14, the joining tool (22) is pressed flat onto the pane (6) lying ready at the pane support (19) and warping in the pane (6) can be eliminated by means of the leveling means (18) in the above-mentioned manner. The manipulator (6) subsequently turns the joining tool (22) with the pane (6) picked up by the gripping means (27). The clamping means (46) or the clamping devices (30, 31, 32, 33, 34, 35) can now be opened and pivoted back into the inoperative position (45). Manipulator (2) then dips the pane (6) with one of its long edges into the moistening means (14). FIG. 15 shows this process step.

Pane (6) is subsequently mounted into the long frame part (8) lying ready in the correct position. Manipulator (2) now guides the pane (6) correspondingly and presses it into the mounting groove of the frame part (8) with the edge (7). The frame parts (8, 9, 10, 11) lie next to one another with the mounting grooves facing upward in the ready position (13) and are accurately positioned here.

Figure 17:
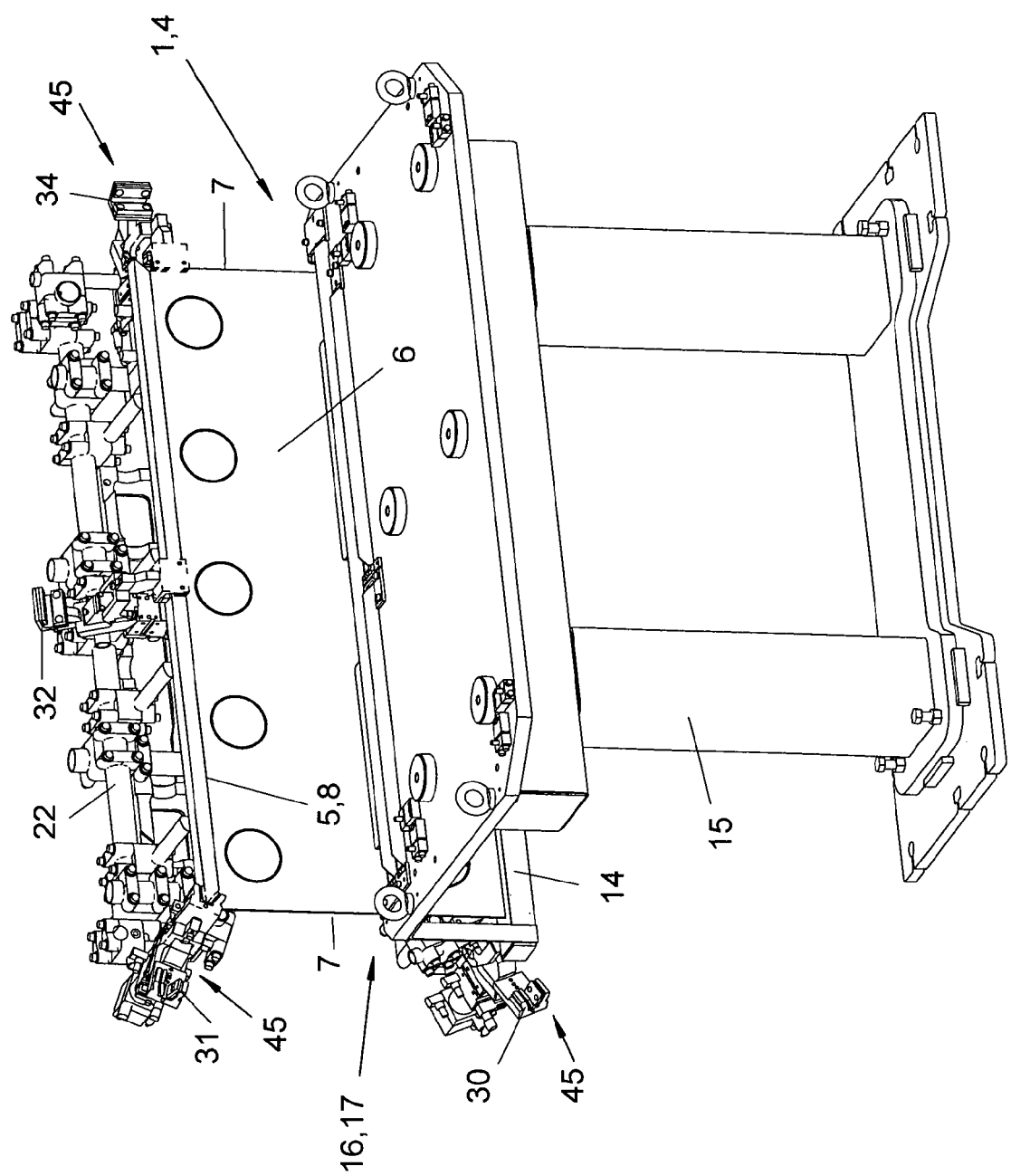
FIG. 17 is a view showing the framing device in another of different functional steps.
Figure 18:
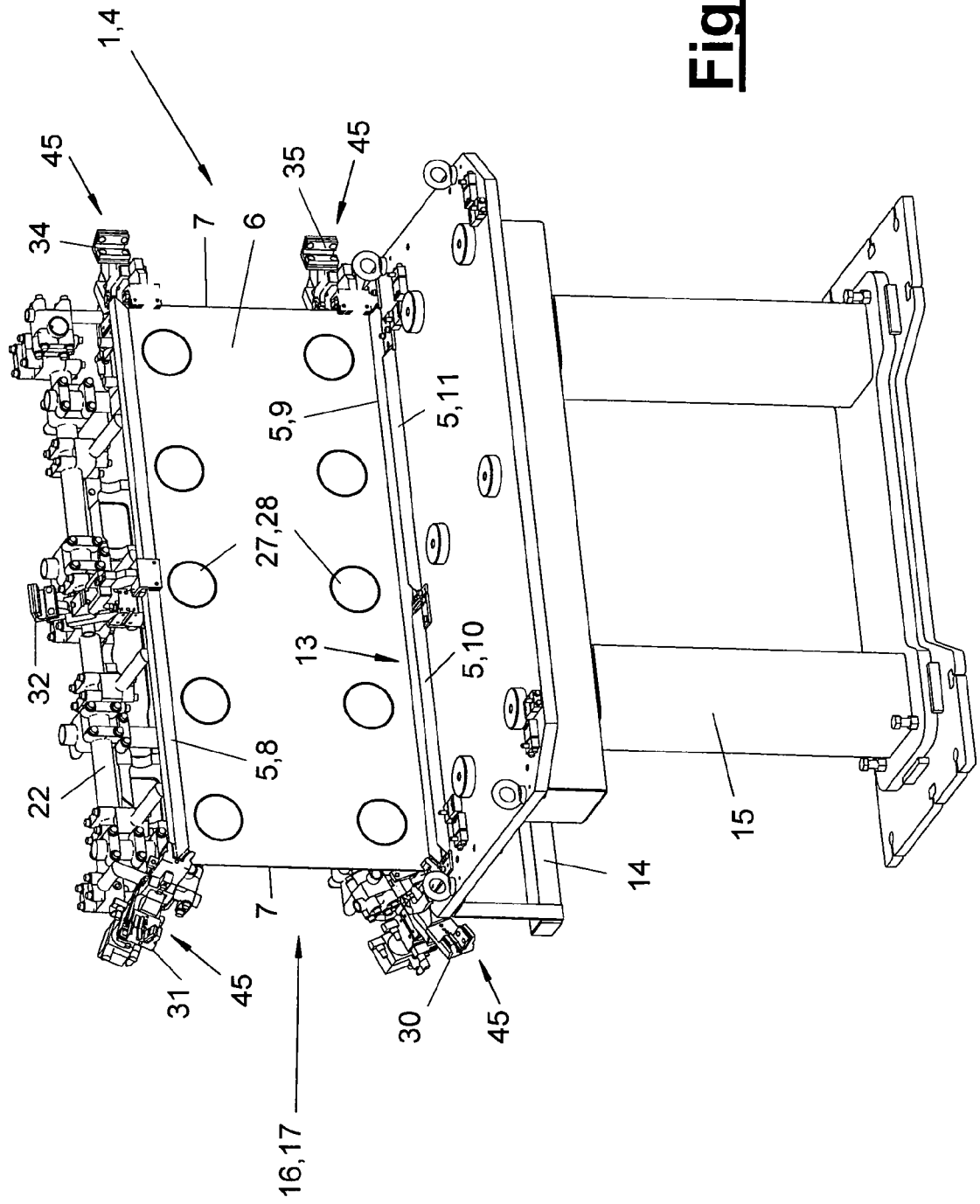
FIG. 18 is a view showing the framing device in another of different functional steps.

In the next step according to FIG. 17, manipulator (2) turns the pane (6) by 180° and dips it with the other long side into the moistening means (14). In the next step according to FIG. 18, pane (6) is raised and mounted and pressed from the top into the second long frame part (9) lying ready, laterally offset with the same vertical orientation.

The clamping devices (30, 31, 32, 33, 34, 35) can be opened during these joining and pressing operations. The forces and motions necessary for the joining can be transmitted by the manipulator (2) via the gripping means (27). The frame parts (8, 9) are held loosely in the ready position (13) and are positioned exactly, e.g., via guide shoes or the like. They can be carried when the mounted pane (6) is raised.

Figure 19:
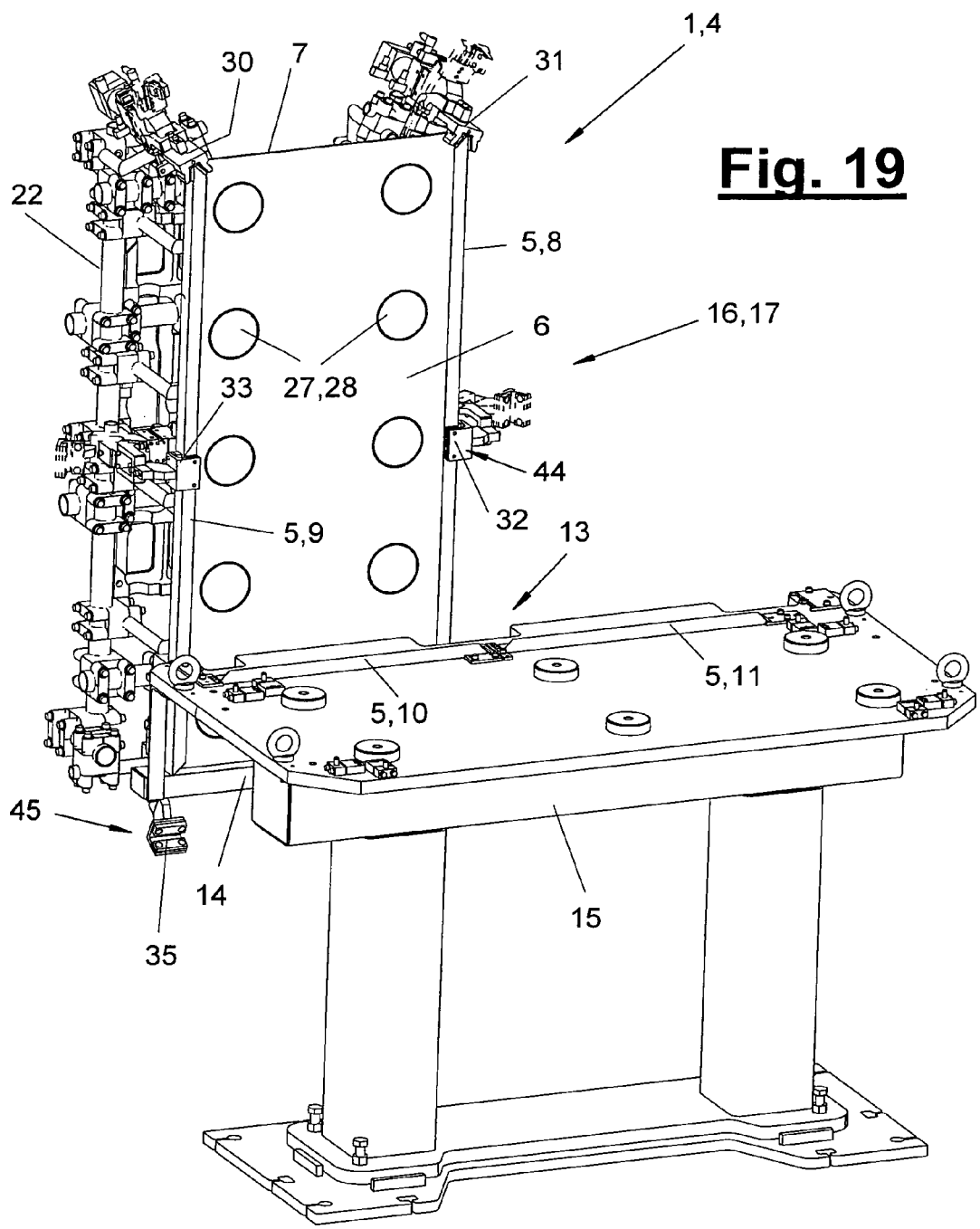
FIG. 19 is a view showing the framing device in another of different functional steps.
Figure 20:
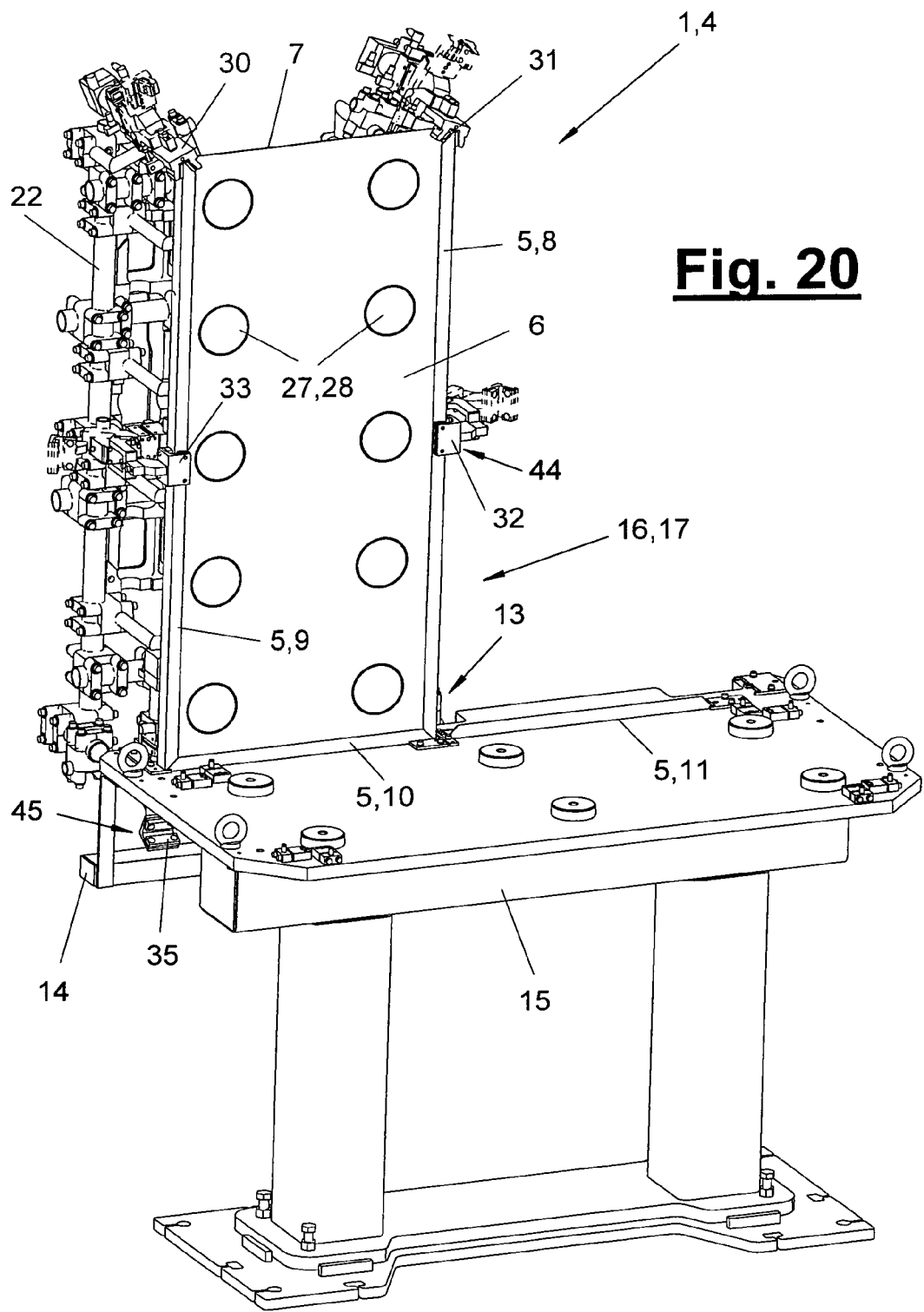
FIG. 20 is a view showing the framing device in another of different functional steps.

For the next step according to FIG. 19, pane (6) is turned by 90° about the transverse axis, and the corner clamping devices (30, 31) come to lie at the upper end of the pane. Pane (6) is then inserted into the moistening means (14) with its lower free edge (7) and opened end clamping devices (34, 35). Corresponding to its narrow shape, it can now be offset eccentrically and positioned at the same time opposite the short frame part (10). Pane (6) is inserted vertically into the short frame part (10) in the next step according to FIG. 20 and is pressed in. The corner clamping devices (30, 31) and the side clamping devices (32, 33) close first and fix the joined long frame parts (8, 9). The corner connectors that may possibly be present can be mounted into the free ends of the short frame part (10) and protrude upwardly with their free legs, and they dip into the mounting chambers at the long frame parts (8, 9) during the joining motion. The joining forces are now transmitted by the corner and side clamping devices (30, 31, 32, 33) and the frame parts (8, 9) are held and guided exactly in the joining positioned.

Figure 21:
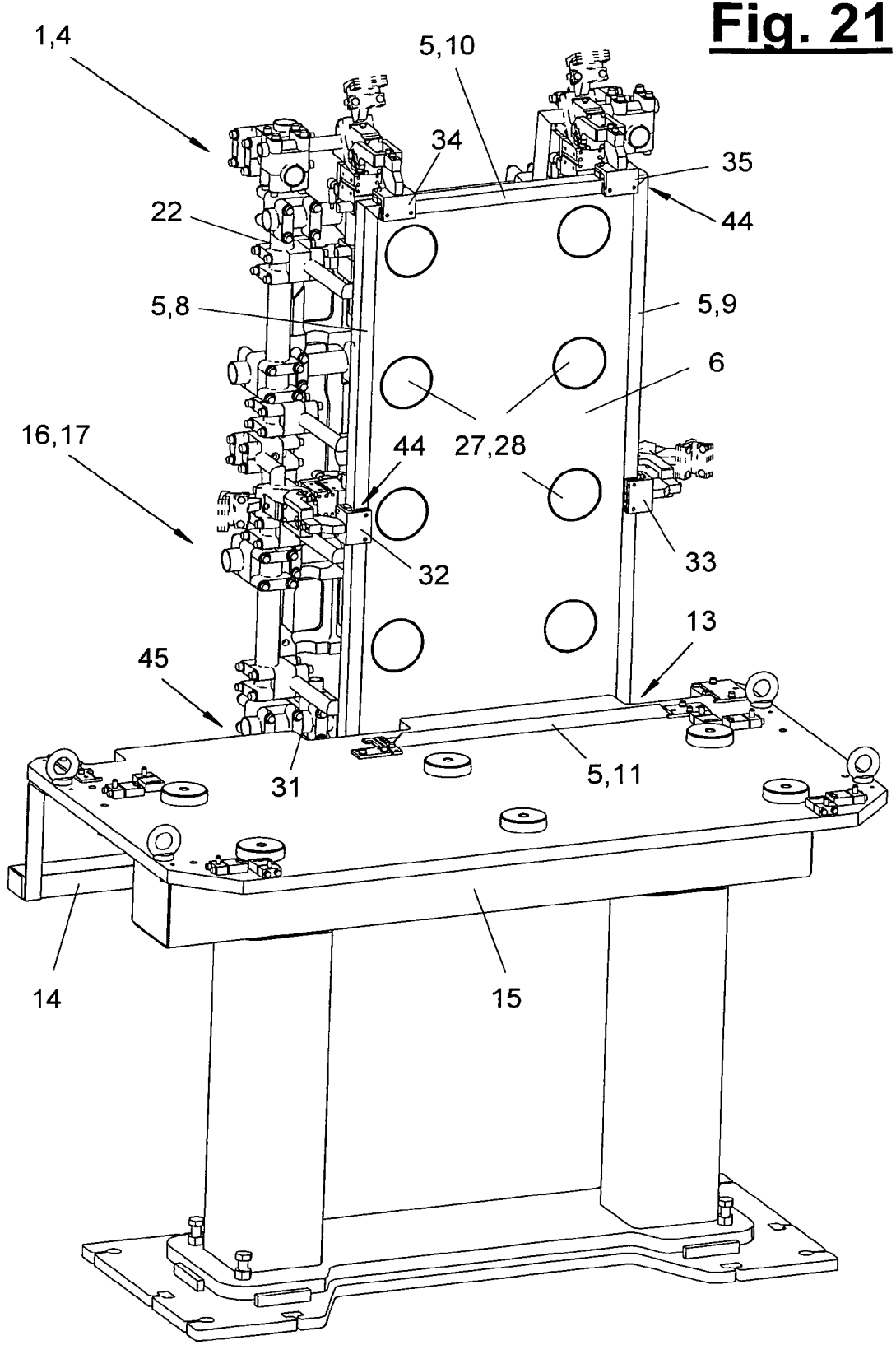
FIG. 21 is a view showing the framing device in another of different functional steps.
Figure 22:
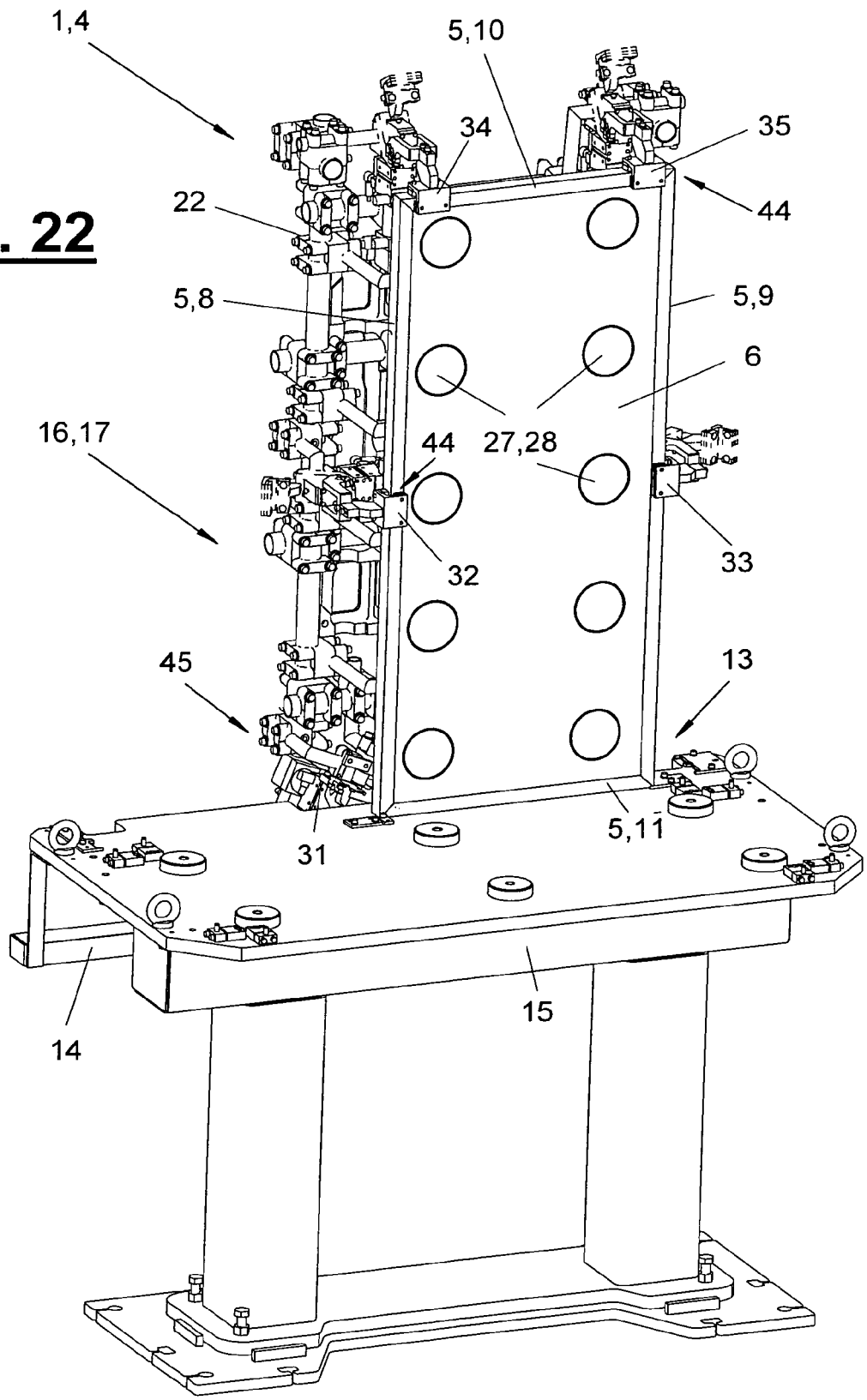
FIG. 22 is a view showing the framing device in another of different functional steps.
Figure 23:
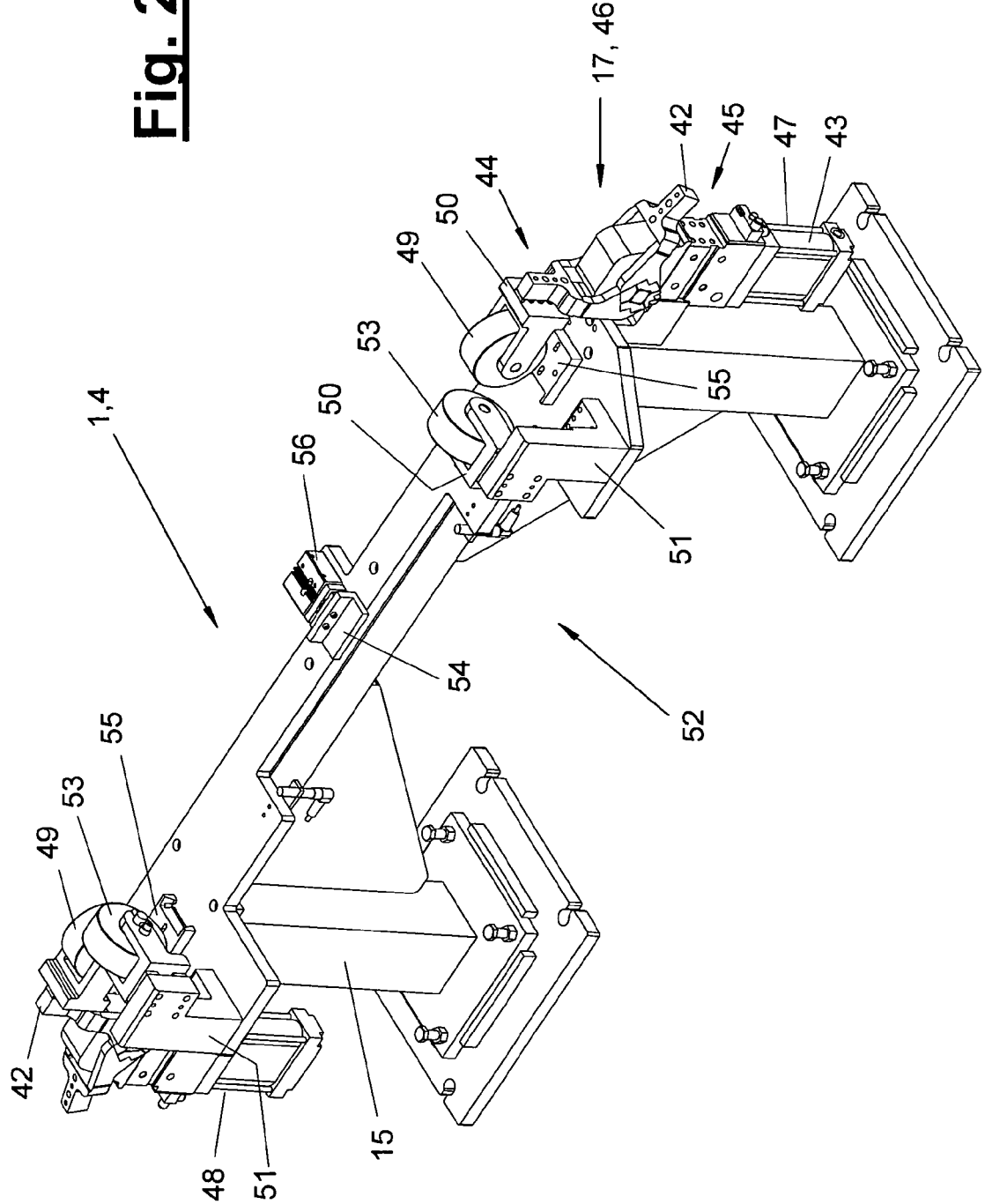
FIG. 23 is a perspective view of a variant of a joining bench.
Figure 24:
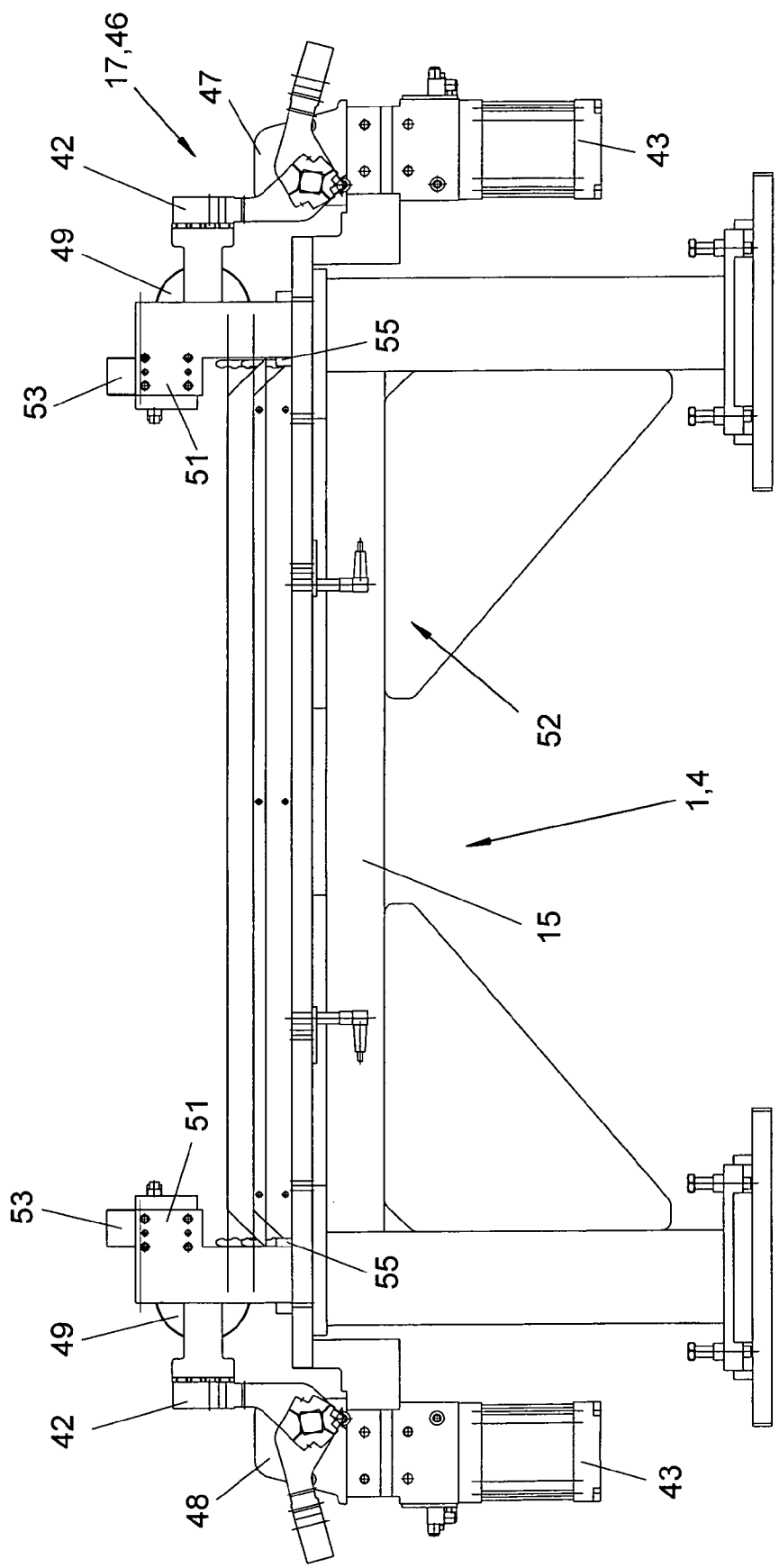
FIG. 24 is a side view of the joining bench according to FIG. 23.
Figure 25:
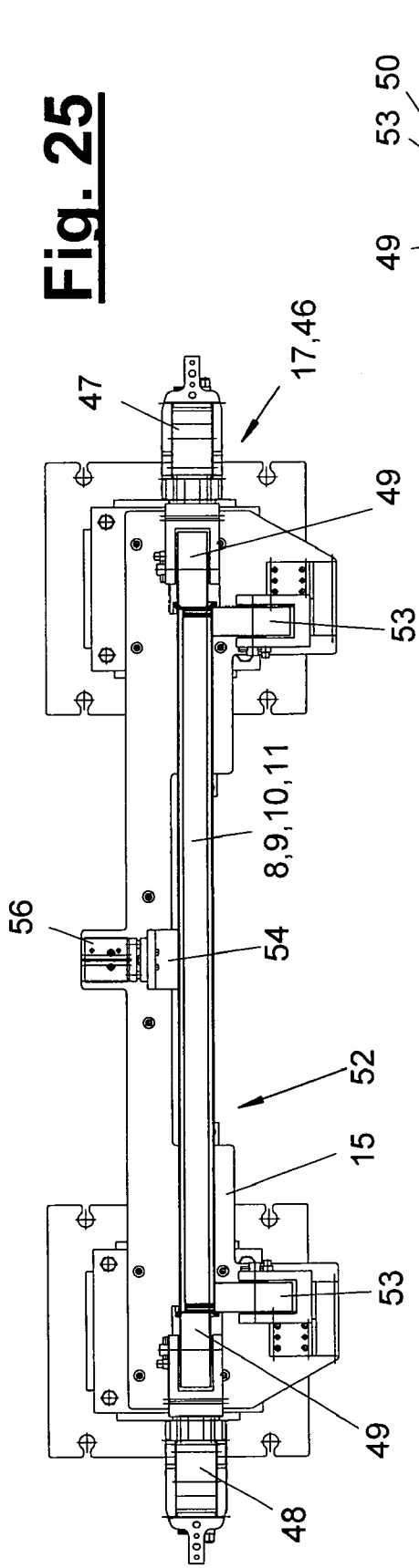
FIG. 25 is a top view of the joining bench according to FIG. 23.
Figure 26:
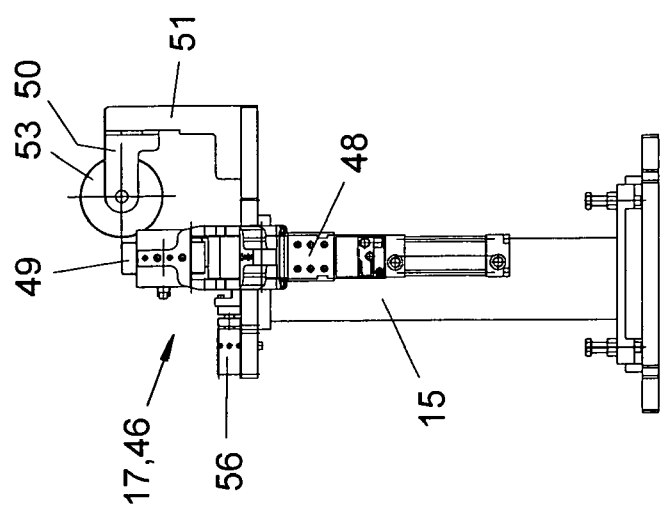
FIG. 26 is an end view of the joining bench according to FIG. 23.

In the last two steps according to FIGS. 21 and 22, pane (6) is again turned by 180° about the transverse axis and is now inserted with its last free edge (7) into the moistening means (14). The corner clamping devices (30, 31) are opened now. Pane (6) is subsequently mounted onto the last short frame part (11) and pressed in, and the corner connector is closed here as well. Joining forces and joining motions as well as the frame parts (8, 9, 10) already joined are secured in their position via the end and side clamping devices (32, 33, 34, 35) pivoted into the clamped position this time as well. Manipulator (2) releases the pane (6) with the frame (5) to a place of deposit, a conveyor or the like and picks up the next pane (6), and the cycle begins anew with the first step according to FIG. 14.

FIGS. 23 through 26 show a variant of the joining means (4) and of the joining holder (15). The ready positions (12, 13) may be arranged externally and are not shown here. Manipulator (2) and its joining tool (22) may have the same or similar design as in the first exemplary embodiment according to FIGS. 1 through 22. The clamping means (46) at the joining tool (22) may be reduced in size and have fewer clamping devices (30-35), and some areas are exposed at the frame parts or sections (8, 9, 10, 11) and are accessible and can be contacted from the outside.

The joining holder (15) is designed as a narrow and bridge-like joining bench here, which can be used as a pressure pad for guiding and supporting the frame parts (8, 9, 10, 11) during pressing onto the edge (7) of the pane. In addition, the joining holder (15) may have a guide means (52) for the pane (6) not shown here and for the one or more prejoined frame parts (8, 9, 10, 11). Furthermore, the joining holder (15) may have a clamping means (46) and be part of the pressing means (17) or joining tool (22).

The joining bench (15) has a narrow bench plate, which has a cutout in the middle area and which is used as a carrier and support for the pane (6) and a frame part (8, 9, 10, 11). The guide means (52) has one or more guide elements (55) for guiding the prejoined frame parts (8, 9, 10, 11) on the bench plate. These may be, e.g., U-shaped guide shoes (55), which border and guide the frame part or frame parts (8, 9, 10, 11) at the edge or corner area on a plurality of sides and which may also have directing bevels for exact positioning of the frame.

The guide means (52) may have, furthermore, one or more additional guide elements (53), which are designed, e.g., as freely rotatable rollers, which are held via roller carriers on brackets (51) that are rigid parts of the bench. The rollers (53) are located above the guide shoes (55) and are used as a side stop and guide for the upright pane edges or frame parts (8, 9, 10, 11). Pane (6) and possibly the frame parts can slide along at the freely rotatable rollers (53) during the robot-guided insertion into the guide shoe (55).

An additional roller (49), directed at right angles to said rollers (53), may be arranged beside the rollers (53) as a stop or directing device, which is likewise located above the corresponding guide shoe (55) and offers a guide for the pane and frame towards the other side. Rollers (49) act from opposite sides on the pane (6) or the frame parts and may be part of the clamping means (46) explained below. As an alternative, they may be arranged similarly to the roller (53) at a bracket (51), which is a rigid part of the bench. The rollers (49, 53) are located at spaced locations above the guide shoes (55).

The guide means (52) may have, furthermore, a laterally acting guide element (54), which is arranged, e.g., in the area of the bench cut-out and is designed as a stop (54). Stop (54) may be designed as an angle sheet iron and arranged stationarily or movably. A feeding means (56), which has, e.g., a pneumatic cylinder and presses the stop (54) approximately centrally against the lower edge of the pane or the frame part located there, is provided in the exemplary embodiment shown and the lateral clearance in the guide shoes (55) is absorbed and the positions of the pane and frame are defined.

The rollers (49) provided on both sides may be part of a clamping means (46) in the manner indicated above. The roller carriers (50) are connected for this to a clamping device (47, 48), which presses the roller (49) onto the upright frame parts (8, 9, 10, 11) and presses same onto the pane edge (7). In the embodiment being shown, the clamping devices (47, 48) have a drive (43) and a mobile, especially pivotable clamping device arm (42), to which the roller carrier (50) is fastened. The rollers (49) are fed and pressed on now in a pivoting motion. The clamped position (44) with the roller (49) and the inoperative position (45) without roller are shown in the drawings.

As an alternative, the rollers (49) may be arranged at a displaceably mounted bracket, which is acted on by the clamping device (47) and is fed to the pane edge or the frame part, possibly against the force of a restoring spring. The clamping device (47, 48) may possibly act on the corresponding roller (49) in a one-sided trailing connection. As in the exemplary embodiment being shown, it can perform a pivoting motion or alternatively a pushing motion with a correspondingly modified drive design. Furthermore, it is possible for the clamping device (47, 48) with the roller (49) to assume an intermediate position, in which the freely rotatable roller (49) assumes a directing and guiding function for the pane (6) and the frame parts (8, 9, 10, 11) thereof. The pressing stroke is applied only thereafter.

Various modifications of the embodiments shown and described are possible. In one variant, the kinematics may be reversed, and the manipulator (2) guides the frame parts (8, 9, 10, 11) attaches them to the edge (7) of at least one pane (6) made ready and presses them on. This can be carried out by means of a correspondingly modified joining means (4) and a joining tool (22).

The corner connectors are positioned exactly and have a relatively firm seating in the frame parts (8, 9, 10, 11) in the exemplary embodiment shown in FIGS. 1 through 22. In one variant, the seating of the corner connectors may have more clearance. The frame parts (8, 9, 10, 11) are first picked up in this case one after another in the manner described in the introduction and mounted onto the pane edges, this taking place with a clearance and without the application of stronger pressing forces. The miter and corner connectors are also not yet closed as a result. The joining of the frame parts (8, 9, 10, 11) may take place with the clamping means (46) opened. The clamping means (46) is subsequently used to press on the frame parts (8, 9, 10, 11) and the correspondingly arranged and distributed clamping devices act uniformly on the frame sections (8, 9, 10, 11) and press these onto the pane edges, and an approach also takes place in the corner area and the miter connection is closed.

Furthermore, it is also possible to carry out the joining of frame parts and the pane in a manner other than with continuous guide or mounting grooves. For example, plug-type connections with pins, clip connections or the like may be carried out. Joining is also possible with the frame (5) partly opened. Furthermore, pane (6) may be prepared for the process in another manner or such preparation may also be eliminated. Furthermore, the design embodiment of the joining tool (22) and of the joining holder (15) is variable. The clamping means (46) may have a different design and arrangement. This also applies to the mount (23).

While specific embodiments of the invention have been shown and described in detail to illustrate the application of the principles of the invention, it will be understood that the invention may be embodied otherwise without departing from such principles.

The invention claimed is:

1. A process for connecting pane-like bodies to a frame, the process comprising the steps of:
   providing a plurality of frame portions;
   providing a manipulator;
   picking up a pane-like body with the manipulator and forming a frame structure by moving said manipulator with said pane-like body connected thereto such that at least a portion of each pane edge of said pane-like body is joined to one of said frame portions, wherein said frame structure comprises said frame portions, wherein the manipulator guides the pane-like body and inserts the pane-like body into the frame portions, the frame portions being pressed at the same time or subsequently pressed onto the pane edge, said manipulator at least rotating said pane-like body about a rotational axis after one said pane edge is joined to one of said frame portions.

2. A process in accordance with claim 1, wherein the frame portions are pressed on by a clamping means located at the manipulator and/or at at least one joining holder, at least one of said clamping means engaging said pane-like body when a first pane edge is joined to one of said frame portions, wherein each clamping means arranged adjacent to one said pane edge is in an unclamped state when said one said pane edge is joined to one of said frame portions.

* * * * *